United States Patent
Ehlbeck et al.

(10) Patent No.: US 6,498,976 B1
(45) Date of Patent: Dec. 24, 2002

(54) VEHICLE OPERATOR ADVISOR SYSTEM AND METHOD

(75) Inventors: James M. Ehlbeck, LaCenter, WA (US); Christopher L. Kirn, Portland, OR (US); Thomas Lenz, Lehrte (DE); Joerg Moellenhoff, Hannover, DE (US); Gerd Roters, Isernhagen (DE); Gerhard Ruhnau, Neustadt (DE)

(73) Assignee: Freightliner LLC, Portland, OR (US)

( * ) Notice: Subject to any disclaimer, the term of this patent is extended or adjusted under 35 U.S.C. 154(b) by 0 days.

(21) Appl. No.: 09/704,461

(22) Filed: Nov. 1, 2000

Related U.S. Application Data
(60) Provisional application No. 60/244,386, filed on Oct. 30, 2000, and provisional application No. 60/244,827, filed on Oct. 31, 2000.

(51) Int. Cl.⁷ .............................................. G01D 21/00
(52) U.S. Cl. ......................... 701/70; 701/71; 701/72; 701/79
(58) Field of Search ....................... 701/70, 71, 72, 701/38, 78, 79, 90, 80, 81, 82, 83, 91; 303/101, 111, 107, 167; 340/440, 438, 461, 459; 180/197, 282

(56) References Cited

U.S. PATENT DOCUMENTS

| | | | | |
|---|---|---|---|---|
| 4,941,365 A | | 7/1990 | Reiner et al. ............ 73/865 |
| 5,825,284 A | * | 10/1998 | Dunwoody et al. ........ 340/440 |
| 6,065,558 A | * | 5/2000 | Wielenga ................ 180/282 |
| 6,081,761 A | * | 6/2000 | Harada et al. ............ 701/72 |
| 6,185,489 B1 | * | 2/2001 | Strickler ................ 701/29 |
| 6,253,123 B1 | * | 6/2001 | Schramm et al. .......... 701/1 |
| 6,263,268 B1 | * | 7/2001 | Nathanson .............. 701/29 |
| 6,278,930 B1 | * | 8/2001 | Yamada et al. ........... 701/82 |

* cited by examiner

*Primary Examiner*—William A. Cuchlinski, Jr.
*Assistant Examiner*—Marthe Marc-Coleman
(74) *Attorney, Agent, or Firm*—Klarquist Sparkman LLP

(57) ABSTRACT

An automatic deceleration control apparatus for a vehicle operates so as to secure appropriate tire grip performance, depending on the conditions of a road surface on which the vehicle runs turning, and restrain excessive rolling of the vehicle body, there by stabilizing the turning behavior of the vehicle at all times. While the vehicle is turning on a high-friction road surface without undergoing haw moment control, a safe vehicle speed is computed within the rollover limit of the vehicle. While the vehicle is turning on a low-friction road surface under haw moment control, on the other hand, a safe vehicle speed that ensures satisfactory tire grip performance is computed in accordance with an estimated road friction coefficient. When the vehicle is about to exceed its safe speed as it turns, it is automatically decelerated to the safe speed or below. Thus, the vehicle can be prevented from spinning, drifting out, or rolling over.

64 Claims, 8 Drawing Sheets

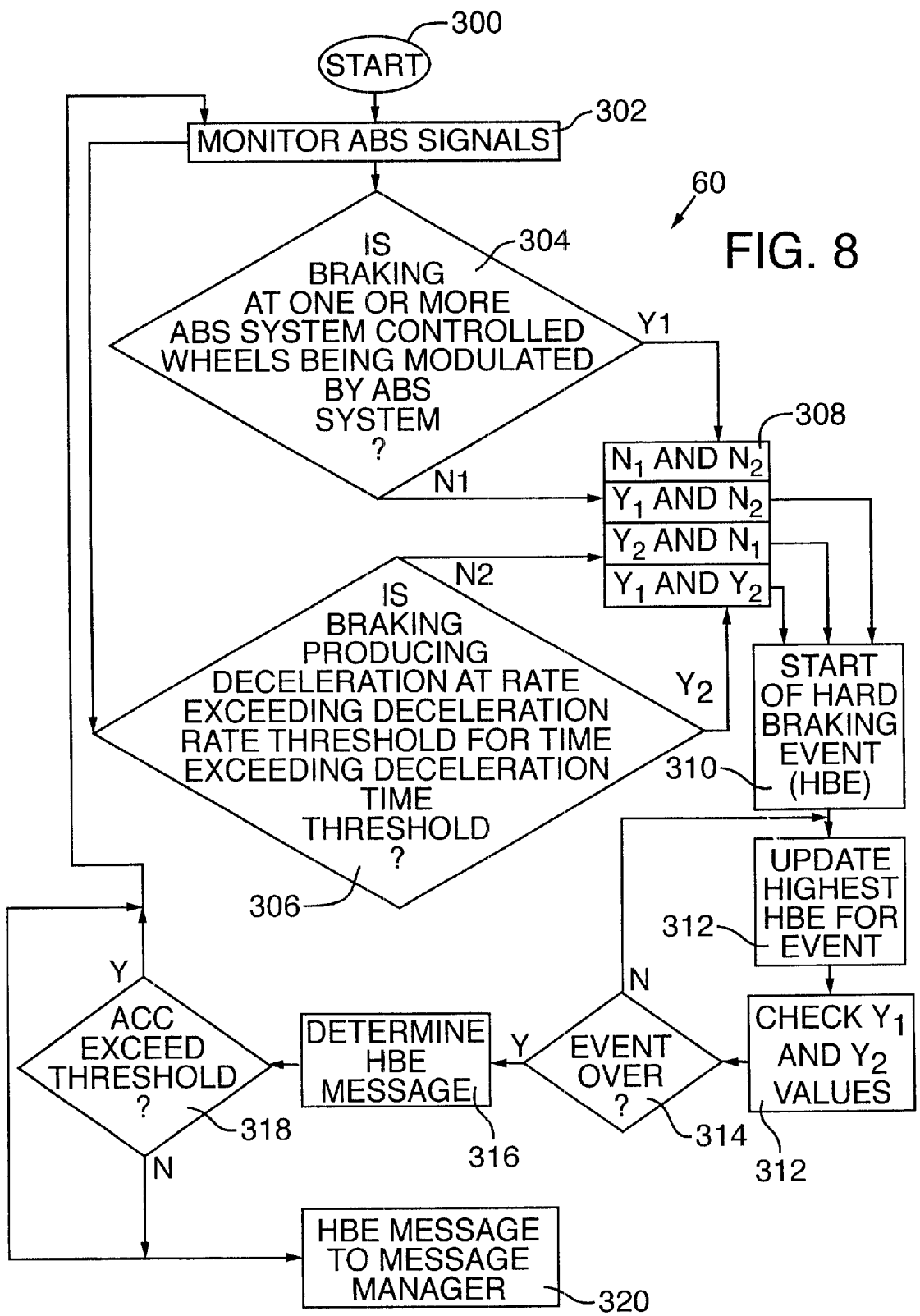

VEHICLE OPERATOR ADVISOR SYSTEM AND METHOD

RELATED APPLICATION DATA

This application claims priority to co-pending U.S. provisional patent application filed, serial No. 60/244,386, filed Oct. 30, 2000 entitled, "Vehicle Operation Advisor System and Method", by James M. Ehlbeck, Christopher L. Kirn, Thomas Lenz, Joerg Moellenhoff, Gerd Roters and Gerhard Ruhnau and U.S. provisional patent application filed, serial No. 60/244,827, filed Oct. 31, 2000 entitled, "Vehicle Operation Advisor System and Method", by James M. Ehlbeck, Christopher L. Kirn, Thomas Lenz, Joerg Moellenhoff, Gerd Roters and Gerhard Ruhnau, which are hereby incorporated by reference.

BACKGROUND

The present invention relates to a method and system for providing advice to an operator of a vehicle that the vehicle is being operated under conditions which may lead to vehicle rollover or, alternatively, to loss of control of the vehicle due to the manner in which the brakes of the vehicle have been applied. Desirably, the information is provided to the vehicle operator following the occurrence of vehicle operating conditions presenting an unacceptably increased risk so that the driver may be educated that these driving conditions have occurred and to avoid such conditions in the future.

Due to the differences in the center of gravity height and mass (load) of vehicles, the rollover threshold of commercial vehicles can vary significantly from load to load and vehicle to vehicle. Commercial vehicles typically include trucks as well tractors which are towing one or more semi-trailers. In the case of trucks, a load cargo area is carried by the truck itself. In the case of tractors with semi-trailers, a load cargo area is typically found in the trailers. In the case of truck tractors, a load cargo area is typically found both on the truck and in a towed trailer. Because trucks are constantly picking up and dropping off loads, the center of gravity of the vehicle and any trailers being towed thereby often varies from time to time. It is the vehicle operator's responsibility to be aware that these variations exist and to adjust the vehicle's speed appropriately, particularly when cornering or braking, so as to operate the vehicle safely. For purposes of explanation, the rollover threshold can be viewed. as operating conditions under which a vehicle would be expected to roll from a position which the vehicle wheels are traveling in contact with the ground toward a position where the vehicle is on its side or otherwise rolls over. In addition to vehicle load, a number of factors affect the rollover threshold, such as vehicle speed, braking conditions, the sharpness of any turn being undertaken, the slope of the road (e.g., crown and banking of curves), the stiffness of the vehicle and trailer suspension, as well as other factors.

The University of Michigan Transportation Research Institute has previously worked on a roll stability advisor system. This research work employed an instrumented fifth-wheel to estimate the trailer's center of gravity height and a lateral accelerometer to determine the lateral acceleration of the vehicle. Estimate of the center of gravity height and lateral accelerometer measurements were used as inputs to dynamically assess the percent of rollover threshold at which the vehicle was being operated. The rollover status information was displayed continuously to the driver. Instrumenting a fifth-wheel tractor-trailer coupling device on a commercial vehicle is not practical, due to reliability and durability problems, and is relatively expensive.

Road User Research of Australia has previously developed and field-tested a road stability advisor system for tractor-tanker-trailer vehicles. The Road User Research system employed Apriori rollover threshold knowledge about these vehicles, along with a lateral accelerometer located at the center of gravity of the tank-trailer, to dynamically assess the rollover threshold. The Apriori rollover threshold knowledge employed in the Road User Research system was not understood to be updated as the load on the vehicle changed. That is, the Road User Research system is understood to assume the rollover threshold is the same whether the vehicle was loaded or empty. Indicator lights on the dash of the vehicle were illuminated to provide the vehicle operator with information about the percent of rollover threshold approached during vehicle operation when predetermined rollover thresholds were exceeded.

Although these and other rollover detection systems have previously been known, a need nevertheless exists for an improved system for evaluating rollover risks and advising vehicle operators of such risks. In addition, an improved system for advising vehicle operators of braking conditions which can lead to loss of control of the vehicle is also desirable.

SUMMARY

The present invention is described throughout with reference to several embodiments. The invention is not limited to the specifically described embodiments. In addition, the invention encompasses features and method acts and steps which are novel and unobvious, both individually and in various combinations as set forth in the claims below.

In accordance with one aspect of an embodiment, the mass of the vehicle and any towed trailers is determined. For example, for a tractor-trailer combination in which two semi-trailers are being towed, the loaded vehicle and trailers may be weighed to determine the mass. As another alternative option, the load at the drive axles of the vehicle may be measured and supplemented by the measured load or by an assumption of the measured load to be carried by the other axles. Other mechanisms for actually measuring the mass of the vehicle may be used. Although relatively straightforward, measuring methods are not very practical or cost effective. This is particularly true in the case of tractor-trailer combination vehicles where any one of numerous trailers may be transported by the same tractor with the trailers having various configurations. Also, the mass is affected by numerous other factors such as how and the extent to which the vehicle and trailers have been loaded. Therefore, it is desirable to dynamically estimate the mass of the vehicle to account for these variables. In one specific approach, the vehicle mass may be estimated based on a summation of longitudinal forces acting on the vehicle and deriving the mass from an application of Newton's Second Law under such conditions. In particular, the mass of the vehicle and towed trailers, if any, may be repetitively estimated at least at selected times when the vehicle is being driven to provide a dynamically varying estimate of the mass.

As another aspect of this particular embodiment, a rollover acceleration value is determined. The rollover acceleration value may comprise a critical rollover threshold estimate related to the lateral acceleration of the vehicle at which the vehicle has an unacceptably increased risk of rolling over. More specifically, the critical rollover threshold may be a value which approaches or is equal to the threshold at which the vehicle and towed trailers, if any, would be expected to roll over under the conditions at which the vehicle is being operated. In a specific approach described below, the rollover acceleration value is determined based on the mass or estimate of the mass of the vehicle and load. The rollover acceleration value may be assigned based upon a rule set. This rule set may be embodied in a lookup table which lists rollover acceleration values for a particular type or types of vehicle having a mass which corresponds to the estimated mass. Consequently, when the mass is determined or estimated, the table can be checked to find a rollover acceleration value for that particular mass. As the mass varies, the table may again be checked to determine the applicable rollover acceleration value for the new estimate of mass of the vehicle. Alternatively, the rule set may be embodied in one or more formulas and may be specifically tailored to given vehicles with given types of loads. Desirably, the rollover values may be assigned based upon an assumed manner in which the cargo area being transported by the vehicle is loaded.

As a further aspect of an embodiment, the lateral acceleration of the vehicle under driving conditions may be measured or otherwise determined. For example, an acceleration sensor may be used which is mounted to the circuit board of an automatically modulated braking system (ABS system) which is used to control the braking of at least selected wheels of the vehicle. Although desirable, it is not required that a sensor be located at this location and other mechanisms for determining the lateral acceleration of the vehicle may be used. Lateral acceleration measurements from a sensor may be processed to remove fixed and variable offsets introduced into the measurements by factors such as any tilting (off-horizontal) mounting of the sensor, arising from electronics, and/or due to variable factors such as the crown on the road on which the vehicle is being driven. The variable factors may be compensated for dynamically, depending upon the conditions under which the vehicle is being operated.

The resulting lateral acceleration determination in accordance with an embodiment is compared with the rollover acceleration value. The closer or nearer the lateral acceleration value approaches the rollover acceleration value, the riskier the driving conditions. That is, the risk of vehicle roll over is increased as the rollover acceleration value is approached. In comparing the rollover value to the lateral acceleration value, a ratio of these two values may be obtained. A rollover risk score may be determined from this ratio. For example, the rollover risk score may be the percentage of the rollover acceleration value achieved by the lateral acceleration value. One or more rollover acceleration value thresholds may be established. These thresholds may be set at predetermined or variable levels below the critical rollover acceleration value or estimate. Alternatively, if the rollover acceleration value is conservative (e.g., established at a level below which the vehicle would roll over), then the thresholds may be equal to or in excess of the rollover acceleration value. In the event the risk of rollover, as determined from the comparison, exceeds one or more of these thresholds, the rollover risk is indicated to the vehicle operator based on the comparison. As a result, the vehicle operator is alerted to the fact that the vehicle has been operated under increased rollover risk conditions. In many cases, vehicle operators, particularly inexperienced operators, do not recognize that these conditions have taken place. By alerting the vehicle operator of the existence of such conditions, the vehicle operator is provided with feedback so that, in the future, the operator will have learned to avoid these conditions.

Rather than distracting the driver with rollover warnings at the time the rollover conditions have taken place, the driver may be alerted to such conditions following the event. In other words, once the rollover risk thresholds are no longer being exceeded, the messages may be sent to the driver to indicate the extent (e.g., the highest threshold that was reached) to which a rollover risk was present during the just completed vehicle operation maneuver. By providing contemporaneous after the fact feedback to the driver, behavior modification (e.g., safer driving) is encouraged. The system provides an effective driver training tool as feedback to the driver is typically provided while the vehicle is still being driven by the driver.

In addition to indicating to the driver that a rollover risk has occurred, and desirably the level of risk, a recommendation may also be indicated to the driver of corrective action that could have been taken to reduce the risk. For example, a speed reduction recommendation may be provided to the vehicle operator. The recommended speed reduction may be varied depending upon the rollover risk level that was determined to exist. The rollover risk levels and corrective action recommendations may be communicated to the driver in any suitable manner, such as with visual or auditory signals or both. Indicator lights may be used, for example, with the lights that are illuminated providing information to the driver as to the level of risk that was determined, and also to indicate the corrective action recommendation, if such recommendations are being made. These messages may desirably be communicated to the driver using an alphanumeric message and display.

The corrective action recommendation may, for example, include a specific speed reduction recommendation. The reduction in speed that is recommended may vary with varied vehicle operating conditions. In addition, a first proposed reduction in vehicle speed recommendation may be made in the event the rollover risk fell into one of at least two categories and a second, different, recommended reduction in speed recommendation may be made to the driver if the rollover risk fell into a different risk category. The speed reduction recommendation is typically a higher recommended reduction in speed for higher risk categories.

In one specific embodiment, three categories of rollover risk are established ranging from highest to lowest risk. Operating conditions in the lowest risk category in this specific example result in no speed reduction recommendation. In contrast, a first speed reduction is recommended in the event the rollover risk falls into the second category and a greater speed reduction recommendation is made in the event the rollover risk falls within the highest category. In indicating the rollover risk to the vehicle operator, the risk levels may be distinguished visually as well as auditorally. For example, if the rollover risk is in the lowest category, the message may be steadily presented to the driver or flashed at a first low rate. In addition, an auditory signal may be provided to the vehicle operator, for example a short alert beep. In the event the rollover risk falls into the second category, the message may be flashed at a rate which is greater than the flashing rate for the low category. In addition, the auditory signal may be of a longer duration and/or be repetitive. In addition, if the highest risk category was determined, the message may be flashed at yet a higher rate. In addition, the auditory signal may be longer or otherwise more intense. One way of accomplishing flashing of a signal is to alternately present a message indicating the level of risk and a speed reduction recommendation with the rate of shifting from screen to screen being increased with higher risk.

To increase the training aspects of the system, the messages may continue until they have been acknowledged by the vehicle operator. For example, a keypad or other data entry device may be provided. The operator may be required to enter data (e.g., push a button or key) in order to terminate the message. In this manner, the driver is required to acknowledge that the driver has been made aware of the risky driving conditions. An icon on the message as well as on the button or data entry key may coincide visually to indicate to the driver which button is to be pressed to acknowledge the feedback.

As yet another aspect of an embodiment, the vehicle may have an automatically modulated braking system which in a conventional manner controls the braking of at least selected wheels of the vehicle. The control of braking at a wheel is modulated under certain wheel slip conditions as determined by the automatically modulated braking system (ABS system). Such systems, for example those which are commercially available from MERITOR-WABCO, typically produce wheel modulation or first signals indicating the modulation of the wheels. From these first signals a determination can be made whether one or more of the wheels are being modulated or having their braking function controlled by the ABS system. ABS braking systems also typically produce wheel speed signals. These wheel speed or second signals indicate the rate at which acceleration of the vehicle (including deceleration of the vehicle) is taking place. In accordance with this embodiment, the first signals may be evaluated to determine whether one or more wheels are being modulated by the automatically modulated braking system. If such modulation is taking place, this indicates a wheel modulation hard-braking event. In addition, the second signals may be evaluated to determine whether deceleration of the vehicle is occurring at too high of a rate. For example, the deceleration may be evaluated to determine whether it is in excess of a first or rapid deceleration rate. To avoid spurious signals, a requirement may be imposed that the rapid deceleration rate is exceeded for a first predetermined time period, which may be varied in duration. In the event deceleration at a rate which exceeds the first deceleration rate for the specified time period is determined, this condition may be considered to be a rapid deceleration hard-braking event. The braking conditions under which a rapid deceleration hard-braking event is indicated may be varied.

In one specific embodiment, a first level of hard-braking event may be indicated in the event a wheel modulation hard-braking event is detected without the detection of a rapid deceleration hard-braking event. In addition, a second level of hard-braking event may be indicated in the event a rapid deceleration hard-braking event is determined without the occurrence of a wheel modulation hard-braking event. Moreover, a third level of hard-braking event may be indicated in the event both the modulation wheel hard-braking event and rapid deceleration hard-braking events have occurred. The existence of hard-braking events indicates the possible operation of a vehicle during braking conditions may lead to a higher risk of lost vehicle control.

Desirably, the determination of the occurrence of first, second and third hard-braking event levels is accomplished after braking conditions have concluded which led to the determination of the particular hard-braking event level. For example, a hard-braking event may be deemed to have commenced when any of the hard-braking levels have been achieved and ended when all of the hard-braking event levels are no longer present. The highest level (first, second and third with third being the highest level) achieved during the hard-braking event may be indicated to the vehicle operator. This indication may be made shortly after the event conditions have ended to provide contemporaneous feedback to the driver. Although hard-braking events may be indicated to the driver at a time they are taking place, this is less desirable. That is, by delaying the indication of the hard-braking events, the driver is not distracted with warning or other messages at the time hard-braking is occurring. As in the case of rollover advisories, advice as to the levels of hard-braking events may be indicated in various ways, such as by alphanumeric messages. Auditory and visual messages, which may be varied depending upon the level of hard-braking event that was detected, may also be used. Furthermore, the vehicle operator may be required to acknowledge the receipt of the hard-braking event messages before a display or other indication of the messages is ended.

Under certain operating conditions, hard-braking events indicate proper operation of a vehicle. Desirably, a vehicle operator should not be warned of a hard-braking event under conditions where hard-braking events were appropriate. In accordance with one specific embodiment, the indication of hard-braking events may be blocked for braking events in which the lateral acceleration value exceeds a predetermined threshold. For example, the indication of a hard-braking event may be blocked if the lowest rollover threshold is detected in the event the hard-braking event detector is being used with a rollover advisor. In other words, at higher levels of lateral acceleration, typically hard-braking events are appropriate. Alternatively, the hard-braking events may be displayed in all cases.

The various risk of rollover levels and hard-braking event levels may be assigned priorities and displayed accordingly. In addition, the levels of risk and of hard-braking events may be varied to more closely approach actual driving conditions. That is, vehicle operators may tend to ignore warning messages and the like if they do not correspond to actually occurring high rollover risk and unacceptable hard-braking event conditions.

The driver or vehicle dispatcher may want to know the number of hard-braking events and rollover risks that have taken place during a particular vehicle trip or which have taken place during a particular leg or segment of a vehicle trip. These rollover advisory events and hard-braking events, when they occur, may be stored in memory such as a vehicle log. This information may be recalled at appropriate or desirable times. In addition, the information may be sent via satellite or otherwise to a remote dispatcher or a remote location.

Regardless of how the rollover risk is determined, an aspect of one embodiment involves determining a reduction in the speed recommendation and communicating the vehicle speed reduction recommendation to the vehicle operator. The speed reduction recommendation may be varied with the evaluated risk of vehicle rollover. For example, a vehicle speed reduction recommendation of a first magnitude may be made in the event of a first rollover risk evaluation. In addition, the magnitude of the vehicle speed reduction recommendation may be of a second, higher amount, in the event the rollover risk is at a second, higher level. Also, as a further aspect of this embodiment, the recommendations for speed reduction are desirably made following the conclusion of driving conditions which led to the vehicle rollover risk. These recommended speed reductions may be made in miles per hour or kilometers per hour. The magnitude of the speed reduction for a given rollover risk may be varied. An alphanumeric display may be used for communicating the recommended reductions in speed and rollover risk levels to the vehicle operator.

The above aspects of embodiments may be implemented in a vehicle operator advising system or apparatus and as methods. Again, the embodiments are particularly useful in advising vehicle operators of vehicle driving conditions which create unacceptably high vehicle rollover risks and/or unacceptably high hard-braking events. Again, the present invention is not limited to embodiments with all of the above features and method acts, but is directed toward such features and acts which are novel and unobvious, both individually as well as to combinations and sub-combinations thereof.

BRIEF DESCRIPTION OF THE DRAWINGS

FIG. 8 illustrates one form of hard-braking event detector which may be used in the embodiment of FIG. 1.

DETAILED DESCRIPTION

Overview

Figure 1:
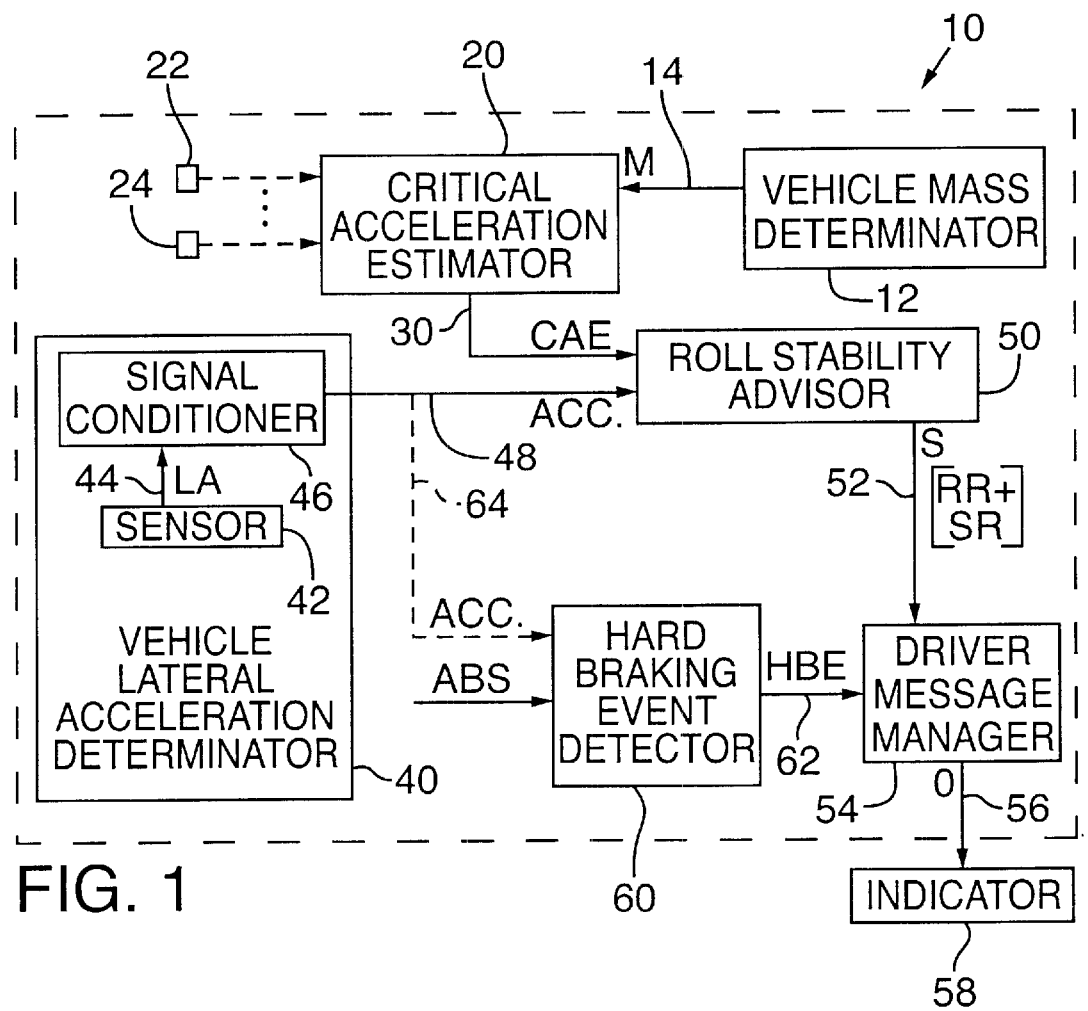
FIG. 1 is a block diagram of one embodiment of a vehicle operator advisory system in accordance with the present invention.

With reference to FIG. 1, an embodiment of a vehicle operation advisor system 10 is illustrated. In general, this embodiment includes a vehicle mass determinator 12 which provides an indication M at an output 14 thereof corresponding to the mass of the vehicle and any towed trailers being transported by the vehicle. In a desirable approach, the vehicle mass determinator 12, instead of weighing or otherwise directly determining the vehicle mass, may provide an estimate of the mass represented by output M. This estimate may be dynamically determined as the vehicle is driving to compensate for changes in vehicle mass, such as due to loading or unloading of the vehicle cargo areas.

Figure 10:
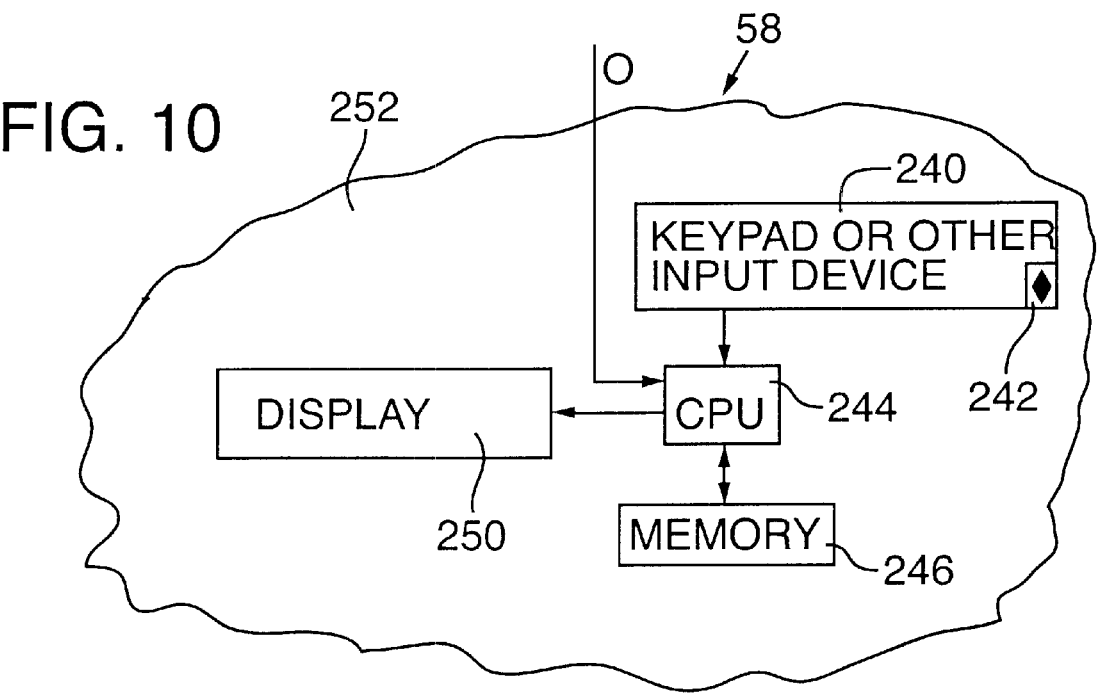
FIG. 10 illustrates a block diagram of one form of indicator for use in communicating the messages to the vehicle operator.

The embodiment of FIG. 10 also includes a form of critical acceleration estimator 20. Estimator 20, in this example, provides an estimate of an acceleration value at which a risk of rollover of the vehicle is unacceptable. The critical acceleration estimator 20 may provide this critical acceleration estimate (CAE) utilizing a rule set, which may be embodied in a formula or formulas and in one or more lookup tables as explained below. The critical acceleration estimator may determine the critical acceleration from a number of factors such as the center of gravity height and distribution (location) of cargo, vehicle track width, roll stiffness of suspensions on the various axles of the vehicle and towed trailers, torsional stiffness of the vehicle and trailers (if any), and other factors. Inputs for signals representing such other factors are schematically indicated at 22 through 24. These inputs are optional in that it is possible to develop rollover thresholds or value levels for specific vehicle applications without taking into account such factors. However, for specific classes of vehicles, the most significant factor that affects vehicle rollover values is the center of gravity height. Although the center of gravity of height of trucks can be monitored directly, since this varies with factors such as vehicle loading, practical difficulties are encountered if one were to attempt to directly monitor this height. Consequently, in the approach illustrated in FIG. 1, a surrogate for center of gravity height is monitored. In this specific example, the surrogate is the mass of the vehicle derived from the vehicle mass determinator 12. Although not without exception, in typical cases the more cargo (mass) that the vehicle is transporting, the higher the center of gravity. Therefore, the critical acceleration level may be estimated based on the mass of the vehicle. In the embodiment of FIG. 1, the critical acceleration estimator provides a rollover acceleration value or critical acceleration estimate at an output 30 with the output indicated as CAE, corresponding to the critical acceleration estimate.

A system of FIG. 1 also includes a vehicle lateral acceleration determinator 40 which determines the lateral acceleration of the vehicle for the conditions under which the vehicle is being operated. Lateral acceleration refers to acceleration in a direction perpendicular to the longitudinal axis of the vehicle. Although various approaches may be used to determine a representation of the actual lateral acceleration being experienced by the driven vehicle, desirably component 30 includes a lateral acceleration sensor 42 for producing a lateral acceleration output LA at an output 44. The lateral acceleration signal LA measured by the sensor is conditioned by a signal conditioner 46. The resulting lateral acceleration signal, corresponding to the measured lateral acceleration, is delivered at an output 48 from the signal conditioner 46 as indicated by ACC at output 48. The signal conditioner most desirably adjusts the measured lateral acceleration signal to be at a reference value corresponding to the vehicle traveling in a straight line down the highway. As a result, as lateral accelerations increase, for example due to the vehicle entering a curve or turning, corresponding to conditions where rollover risks often increase, the ACC signal more closely follows the actual lateral acceleration variations which occur under possible rollover risk conditions.

Although the sensor output signal may be used directly, the illustrated signal conditioner typically filters out noise and fixed offsets from the signal (offset in this case refers to deviations from the reference). In addition, variable offsets can be introduced due to operating conditions of the vehicle. For example, variable offsets can be introduced by unbalanced loading of the cargo, crowns in the roadway on which the vehicle is being operated, the suspension system of the vehicle, and other factors. The signal conditioner may include a mechanism for varying the offset as the vehicle is operated so that the ACC signal more closely represents lateral accelerations arising from cornering of the vehicle. The signal conditioner may also vary the rate at which the offset is adjusted depending upon driving conditions. For example, if the vehicle is sharply cornering, the rate at which the offset is adjusted may be extremely slow or effectively set to block any offset adjustment during such conditions. Conversely, if the vehicle is traveling a straight line, the rate at which the offset is changed as a result of dynamically varying conditions may be increased. Similarly, the rate may be varied so as to adjust the rate of change of the offset at intermediate rates of adjustment under driving conditions where the vehicle is cornering slightly. Changes in the rate of offset adjustment are not limited to these specifically described examples.

In the embodiment of FIG. 10, a roll stability advisor 50 receives both the CAE and ACC representations. The roll stability advisor compares these representations to determine whether a risk of vehicle rollover is such that a warning should be provided to the vehicle operator. In general, the nearer the ACC value approaches the CAE value, corresponding to the nearer the determined lateral acceleration approaches the critical acceleration estimate or rollover acceleration value, the higher the rollover risk. Again, as previously pointed out, the CAE value may be conservatively set to be below an actual value where rollover would be expected to occur. Alternatively, the CAE value may be set at higher levels.

Typically, a vehicle must be operated at a lateral acceleration that would produce vehicle rollover for more than an instant for a vehicle rollover risk to be significant. For example, lateral acceleration levels slightly in excess of levels which would cause a vehicle to roll over typically must be present for at least about one second or more before a genuine risk of vehicle rollover exists. If the lateral acceleration exceeds the tip-over acceleration signficantly, the truck would tend to rollover faster. Consequently, the roll stability advisor may include a delay or filter or other mechanism for verifying that the ACC lateral acceleration level is at a value corresponding to a rollover risk for a time, such as a predetermined time which may be varied, before a rollover risk event is indicated to the vehicle operator.

The roll stability advisor 50 may utilize any suitable approach for comparing the received signals. In one specific example, a ratio of ACC to CAE values is taken with the ratio being multiplied by 100 to develop a rollover score. Thresholds of one or more score values may be established. If the score exceeds a first threshold, a first level of rollover risk may be indicated. Similarly, if the score exceeds a second threshold, a second level of rollover risk may be indicated. In addition, if a third threshold is established, a score in excess of the third threshold may produce an indication of a third rollover risk. Any number of levels may be established. Also, the values may be compared directly without computing a score. It should be noted that the reference to a value exceeding a threshold also includes the value being equal to the threshold as in such a case the actual threshold would be the value immediately below the stated threshold. As a result of the comparison, or of the processing of these signals, the roll stability advisor produces an output on line 52 indicated by S. The output S includes information indicating that a rollover risk was present. In cases where plural categories of rollover risks are described, the output contains information as to which category the risk fell. Rather than assigning the risks to categories, the output may, for example, simply indicate the level of risk.

In the illustrated embodiment, and more specifically in a more desirable approach of this embodiment, the rollover risks are determined after a rollover advisory event. The rollover advisory event may be deemed to commence when the rollover risk exceeds a particular rollover level. The rollover advisory event may be deemed to end when the rollover risk drops below the level or after the rollover risk drops below the level for a time period, which may be adjustable and/or predetermined. One specific example is a fixed time period of two seconds. By making the determination after the event, the system can evaluate the highest rollover risk level occurring during the event. The signal S may contain information indicating the highest level of rollover risk that was reached during the rollover advisory event. In addition. the roll stability advisor signal S may include a speed reduction recommendation computed for the specific conditions. Alternatively, and less desirably, fixed magnitude speed reduction recommendations may be indicated which respectively correspond to the particular rollover risk levels that occurred. The speed reduction recommendation may be varied, for example for given vehicle types. In addition, the speed reduction recommendation typically have a magnitude which is increased with increasing rollover risk operating conditions.

The signal S is delivered to a driver message manager in this embodiment. The driver message manager provides an output O on a line 56 to an indicator 58. The driver manager and indicator may take any suitable form. As one desirable example, the driver message manager and indicator may take the form which is commercially available on Freightliner Century Class® trucks with the indicator being a 2 line by 20 character vacuum florescent display for displaying alphanumeric messages. The driver message manager, in response to the signal from the roll stability advisor, designates the appropriate message to be deliver to the indicator 58.

In a most desirable example, the rollover risk and speed reduction recommendations, if included, are displayed to the driver after the conditions leading to the rollover risk have ended. Consequently, the driver is not distracted by rollover advisors and speed reduction recommendations while the driver is dealing with the conditions that led to the rollover risk.

The embodiment of FIG. 10 also includes a hard-braking event detector 60 which may be included in combination with a roll stability advisor or independently of the roll stability advisor. The hard-braking event detector determines whether the vehicle has been operated under braking conditions which may create unacceptable risks of loss of vehicle control. More specifically, as hard-braking approaches an unacceptably high level, a hard-braking event indicating signal (HBE) is delivered along line 62 to the driver message manager. Indications of hard-braking events may be included in message control signals from the driver message manager to the indicator. The hard-braking event signals may also be prioritized by level or degree of risk presented by the hard-braking event.

In determining whether hard-braking conditions exist that would warrant advising a driver, vehicle wheel speed may be monitored with decelerations in excess of a rapid deceleration value indicating the existence of hard-braking event. Typically, the deceleration levels in excess of this threshold must be present for a period of time in order for a hard-braking event condition to be indicated. The period of time and rapid deceleration values may be varied. Deceleration levels may be obtained from a conventional ABS braking system incorporated on the vehicle. That is, ABS systems typically produce signals corresponding to wheel speed and hence accelerations and decelerations of the vehicle. In addition, ABS systems are coupled to selected wheels of the vehicle for modulating the braking at the selected wheels. Typically, ABS systems monitor wheels to determine whether particular wheels are slipping relative to other wheels with braking conditions being controlled or modulated in response to the wheel slippage indications. ABS systems typically produce signals (e.g., modulator value control signals) indicating that the wheels are being modulated. By looking for wheel modulation, and in a specific approach determining whether at least one of the wheels is being modulated, this provides another indicator of a hard-braking event condition. Specifically, a hard-braking event may be indicated if at least one of the wheels is being modulated. A hard-braking event at a first level may be indicated if a wheel is being modulated without a rapid deceleration event taking place. A second level of hard-braking event may be determined which corresponds to a rapid deceleration (e.g., a deceleration in excess of a threshold for a predetermined time) without at least one of the wheels being modulated by the ABS system. A third level of hard-braking event may be determined in the event both at least one wheel is being modulated by the ABS system and a rapid deceleration in excess of the threshold for a predetermined period of time is taking place. These various hard-braking event levels may be communicated to the driver message manager and used in determining the message to be indicated to the driver by the indicator 58.

The hard-braking event detector may operate after the fact. For example, a hard-braking event may be deemed to have commenced when at least one of the hard-braking event levels is determined. The hard-braking event may be deemed to have ended when all of the hard-braking event levels are absent following the start of the hard-braking event as indicated by the initial determination of the presence of at least one hard-braking event level. This provides contemporaneous feedback to the driver after hard-braking and may be used in training the driver to avoid undesirable hard-braking events in the future.

At times hard-braking events are necessary to safely operate a vehicle. A driver or vehicle operator would tend to ignore signals which are unrealistic. In other words, if the hard-braking event detector provided warnings at times when the driver is supposed to be engaged in hard-braking, the warnings become less credible. As an option, the embodiment of FIG. 10 utilizes a hard-braking event detector which also receives the ACC signal on a line 64. The hard-braking event detector in one form compares the ACC signal with an acceleration threshold which may, for example, be set equal to the critical acceleration estimate or some fraction thereof. For example, this threshold may be set equal to the lowest level at which a rollover risk is to be indicated. If the lateral acceleration indicated by the ACC signal is in excess of the acceleration threshold, the hard-braking event detector blocks the delivery of hard-braking event warnings as these conditions typically correspond to situations where hard-braking is desired.

Vehicle Lateral Acceleration Determinator

In one specific form, the vehicle lateral acceleration and roll angle are measured using a sensor 42. One suitable sensor is a VTI Hamlin Part No: C23H1G accelerometer. This particular accelerometer is a silicone micro-machined accelerometer that is DC coupled to signal conditioning circuitry 46. Both the vehicle lateral acceleration and roll angle are desirably measured in the illustrated embodiment, because the roll angle can increase or decrease the lateral acceleration required to rollover the vehicle. The accelerometer and associated circuitry may be mounted in an 8-pin DIP package. An accelerometer packaged in this form allows it to be mounted directly to a printed circuit board that already exists in a vehicle having an ABS system. Specifically, a typical ABS braking system has an electronic control unit (ECU) in a housing containing a printed circuit board to which the accelerometer package may also be mounted. This mounting approach reduces the space and cost required in comparison to a separate housing, mounting and wiring in the event a discrete accelerometer were used. However, a discrete accelerometer remains an option. Again, other mechanisms may be used for determining lateral acceleration of the vehicle although less desirable. For example, yaw rate sensing may be performed. Another alternative is to monitor the difference in wheel speeds of nondriven axle(s) to determine the radius of curvature of a curve. The acceleration can then be estimated based upon the formula $$a = \frac{V^2}{R},$$

wherein a is the acceleration, V is the speed and R is the radius of curvature as determined from the wheel speeds.

Digital Signal Conditioning

Figure 2:
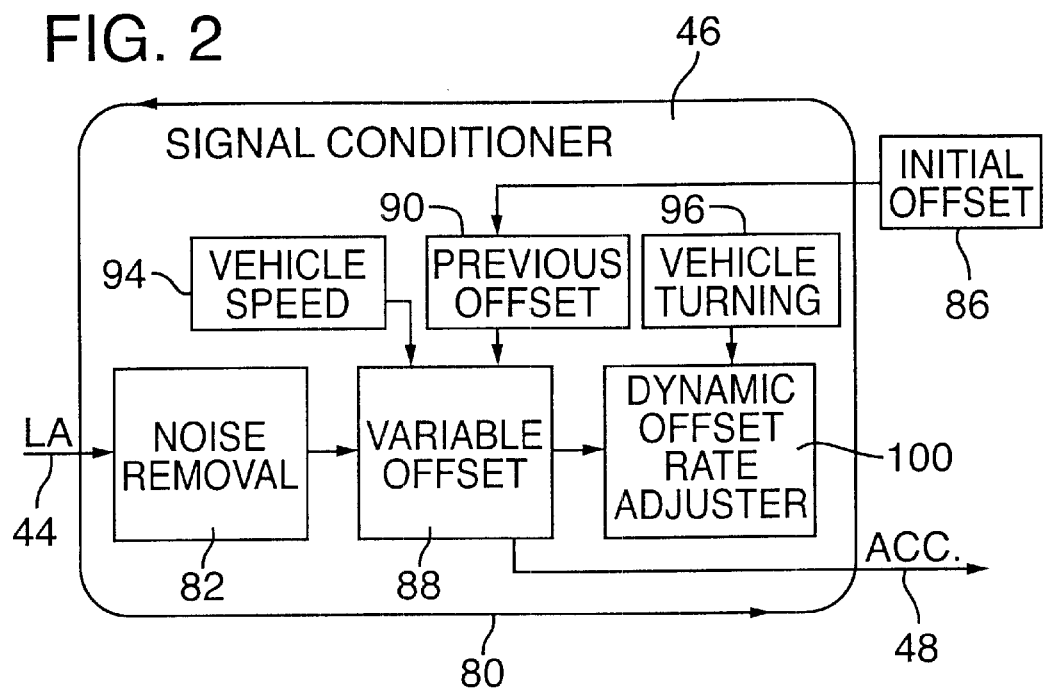
FIG. 2 is a block diagram of one form of signal conditioner which may be utilized in the embodiment of FIG. 1.

With reference to FIG. 2, an exemplary digital signal conditioner 46 is indicated. Signal conditioner 46 in the illustrated form operates in a loop fashion indicated by loop 80 with the conditioning steps set forth therein being repeated over time to adjust the ACC output signal at output 48 to more closely track the actual lateral acceleration of the vehicle as the vehicle corners.

The analog acceleration signal supplied by the accelerometer contains noise and a DC offset in addition to the lateral acceleration and roll angle measurement. The unwanted DC offset results from an electrical "zero" offset on the acceleration signal LA and/or a roll angle offset due to mounting the accelerometer at a small roll angle on the vehicle. If a DC coupled accelerometer is not mounted in alignment with the earth's gravitational field, an output signal is typically produced. The noise and unwanted DC offset signals are preferably removed before a closer presentation of the true lateral acceleration level plus (or minus) the roll angle can be determined.

The first step employed in this removal process is to digitize the analog signal from the accelerometer. The accelerometer itself may also produce a digital output signal. Next, the digitized version of this signal is filtered using conventional low pass digital filtering of the signal technology. This filtering is indicated by block 82 in FIG. 2. This removes the unwanted noise but not the unwanted DC offset. Removal of the DC offset is more challenging. Because the vehicle could be parked (idling) at a roll angle for long time periods, simply low pass filtering, although possible, is less desirable because this produces an inaccurate estimate of the unwanted offset when the vehicle is then driven. Although this is a transient condition that will self correct as the vehicle is driven, it may require several minutes of operation before accurate lateral acceleration measurements are again available. Because rollover conditions can be encountered at anytime once the vehicle is moving, it is desirable to minimize any delay before accurate lateral acceleration information is available.

To minimize this delay time, the following procedure was developed and implemented in a variable offset filter indicated at 88 in FIG. 2. An initial estimate of the unwanted DC offset is programmed into the system (see block 86). This provides a means to remove an estimate of the offset as soon as the system is switched on by way of an offset removal device, which may be a variable offset filter 87. In addition, the initial estimated value that is stored in memory is updated and stored as a previous offset (see block 90). For example, the value may be updated every 200,000 cycles (about every ten to fifteen minutes) as the vehicle is operated. In subsequent cycles, the previously stored offset is used as the new initial offset. The advantage of updating this initial offset value is that it provides a means for the system to learn from its most recent operation and to accommodate changes in the system due to time or mounting angle of the accelerometer.

To avoid the problem of developing an inaccurate offset estimate when the vehicle is parked, the unwanted offset estimate in this embodiment is only updated by filter 88 when the vehicle is being driven; i.e., when the vehicle speed is over a selected value. Vehicle speed signals are obtained at block 94 and are available from, for example, wheel sensors or other sources (e.g., from the data bus of the vehicle). Although this avoids problems associated with parked vehicles, it does not guarantee the accuracy of the unwanted DC offset. For example, if the vehicle is driven in a curve (or series of curves in the same direction), a simple low pass filter offset removal will accumulate an error that may require several minutes of operation on a straight roadway to be corrected.

To overcome this limitation, information from the steering axle (non driven) wheel speeds may be employed (see block 96 in FIG. 2) to determine how straight the vehicle is traveling. This information is used to vary the response time of the DC offset low pass filter/estimator 88. For example, the filter rate may be adjusted to have a faster filter response the straighter the vehicle is traveling.

More specifically, in the illustrated embodiment, a dynamic offset rate adjuster 100 operates in response to the vehicle turning information from source 96 to adjust the rate that the offset established by filter 88 is varied. For example, the offset may be adjusted every two to three minutes in the event the vehicle is traveling along a straight line. In contrast, when the vehicle is turning a sharp corner, the offset adjustment rate may be set so high as to be effectively off (e.g., for example adjusting the adjustment rate to one adjustment per hour). Depending on wheel speed differences, the rate of offset adjustment may be varied between these two extremes. For example, four different offset rates (e.g., filter time constants) may be used depending upon wheel speed differences. This approach relies on the fact that when a vehicle is cornering, the wheels on the outside of the curve travel at a faster speed than the wheels at the inside of the curve (e.g, about a four percent difference in a sharp turn).

The dynamic filter is selected typically for a specific class of vehicles and can be varied for another class of vehicles. For example, one dynamic filter may be selected for Class 8 trucks, with a Freightliner Century Class® truck towing a single semi-trailer being a specific example. Factors affecting the operation of the dynamic filter include the wheel base, the weight of the truck, the track width of the vehicle.

A specific form of signal conditioner for a class 8 Freightliner Century Class® truck towing a single trailer is set forth below. The filter may be empirically determined for other trucks. Alternatively, one can simply assign offset rate adjustment rates based on the extent to which a vehicle is turning.

In a specific example. the analog signal of the accelerometer is digitized by a 10 bit A/D converter and delivered to input 44 of FIG. 2. The digitized accelerometer value LA is filtered by a standard low pass filter 82. The chosen response time (cut off frequency) of filter 82 is typically selected to be a good compromise of suppression noise and an acceptable delay for the acceleration value. The digitized accelerometer value at a certain time n is named x (n). X(n) is the input for the filter. The output signal is named y(n). A second order digital filter uses one value from the last filter step (n−1) and one from the step before named (n−2). In this case, an exemplary form of recursive digital filter, operated every three milliseconds is expressed as follows:

$$y(n)=c*x(n)+d*y(n-1)-e*y(n-2)$$

the specific values for the particular vehicle type are chosen with c=0.002 d=1.9469 e=0.9489 with c+d−e=1

This is a standard second order digital filter method. This filter is optimized for one vehicle type. For other vehicles, other filter coefficients may be preferable.

All values (n); (n−1); (n−2), in this case, are set to zero in this example when the ignition is turned on.

The offset removal at block 88 may be made, for example, using a standard first order filter method according to the following formula:

$$z(n)=k*y(n)-(1-k)*z(n-1)$$

The value k is variable. As long as the vehicle speed is below 5 mph, in this example, k is set to 0, which means that the value is effectively not changed. In this case, the filter has an infinite response time. If driving in a sharp curve, detected by the difference between the front axle wheel speed of wheels on the inside and outside radius of the curve (e.g., a four percent speed difference), in this example, k is set to a value to provide a response time of 60 minutes. In other cases, corresponding to relatively straight driving conditions, k is set to a response time of 15 minutes. The first value for z(n), in this example, is set during electronic control unit production to the middle of the accelerometer supply voltage range (e.g., 2.5 volts). The z(n) value is periodically stored in this example, e.g., in non-volatile memory, every 30 minutes and used as the new starting value for the next ignition on case (when the vehicle is again started). One cell in the memory may be used to indicate that z(n) was never updated. Under these conditions, the response time is set to 2 seconds for a period of 12 seconds to remove the first offset in a very short time.

The signed acceleration (positive or negative value), in this example, is calculated as follows:

$$a(n)=y(n)-z(n)$$

The invention is not limited to any specific approach of signal conditioning. An approach which produces lateral acceleration measurements which more closely reflect actual lateral accelerations encountered from turning of the vehicle is desirable.

Vehicle Mass Determinator

Figure 3:
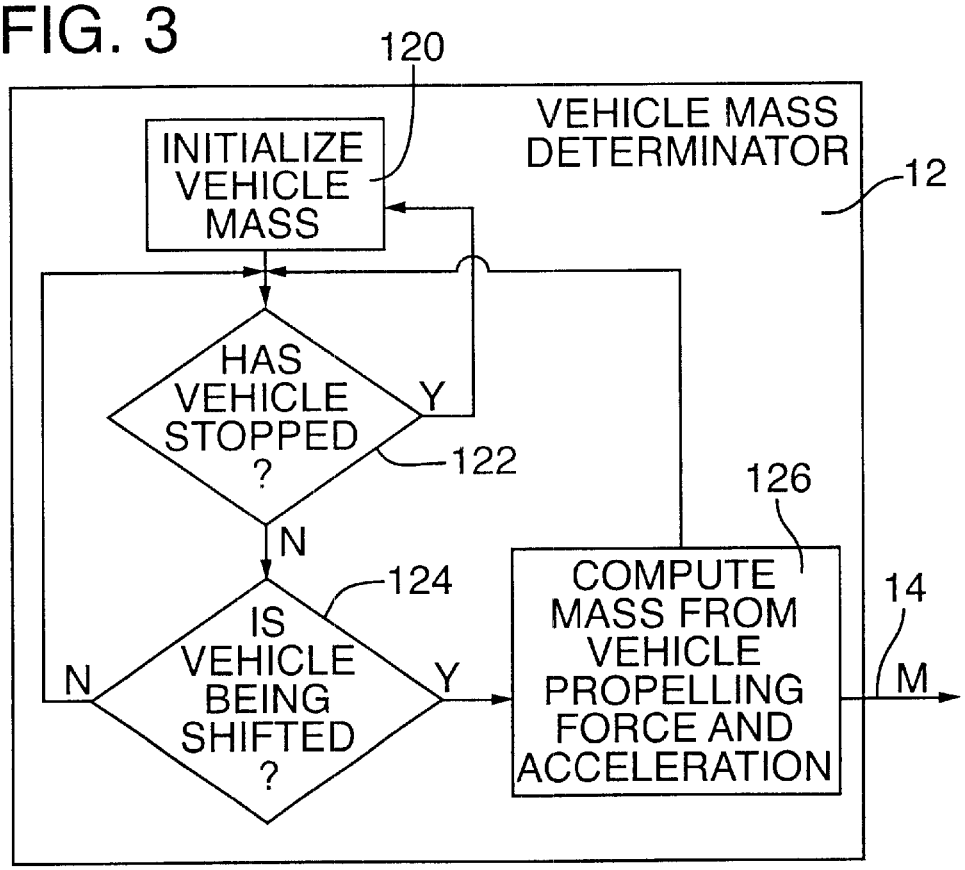
FIG. 3 is a block diagram of a specific form of vehicle mass determinator which may be included in the embodiment of FIG. 1.

The vehicle mass determinator 12 may take a number of forms. For example, mass determination may involve measuring the load carryied by each of the axles of a truck/tractor and by any towed trailers. Another approach is to measure the load at the drive axles of the vehicle and add to this value the value that is carried at the other axles. Still another approach for estimating the mass of the vehicle involves computing an estimate of the vehicle mass based on the longitudinal dynamics of the vehicle. This approach is disclosed in U.S. Pat. No. 4,941,365, issued Jul. 17, 1990, to Reiner et al. and entitled, "Device for Determining the Mass of a Motor Vehicle". The basic approach of this type of vehicle mass estimator is illustrated in FIG. 3.

At block 120, an initial vehicle mass is determined. This can be entered by a data entry device such as a keypad. This initial value may correspond to the maximum allowable weight of a loaded vehicle plus a safety factor. For example, an initial mass of 110,000 pounds (50 metric tons) may be assigned for a Freightliner Century Class® tractor towing one trailer (corresponding to a typical maximum allowable weight load of 80,000 pounds (without special permits) for a 5-axle vehicle tractor and trailer, plus a safety factor. At block 122, a determination is made as to whether the vehicle has stopped. This can be determined from wheel speed information. If the answer is "yes", the system in this example returns to block 120 with the vehicle mass then, for example, being initialized to its initial value.

If the vehicle has not stopped, a question block 124 is reached at which point a determination is made as to whether the vehicle is being shifted. If the answer is "no", the system returns to the input to block 122 and the cycle continues. If the vehicle is being shifted, a block 126 is reached at which point the mass of the vehicle is determined. Following the determination of the estimated mass of the vehicle, the process returns to the input to block 122. In this example, the reason for the making the determination at the time a vehicle is shifting is because computations are simplified.

More specifically, in this embodiment, the vehicle mass is estimated based on monitoring the longitudinal dynamics of the vehicle by repetitively applying the following application of Newton's Second Law at two selected points in time. This equation is desirably repetitively applied as the vehicle is being driven to update the mass estimate.

More specifically, the summation of the longitudinal forces acting on the vehicle are described as follows:

$$\Sigma F = F\text{rolling} + F\text{grade} + F\text{aerodynamic} + F\text{drive} = m*a$$

Where,

F rolling is the force equivalent to the vehicles rolling resistance

F grade is the gravitational force due to the gradient of the roadway

F aerodynamic is the force equivalent to the vehicles aerodynamic drag

F drive is the force that is propelling the vehicle m is the mass of the vehicle a is the acceleration of the vehicle

* refers to multiplication of the values $\Sigma$ refers to the summation.

The two selected points chosen in time are as follows: The first point (t1) is at a time when a shift of the vehicles transmission is occurring. For this condition, the force propelling the vehicle is zero; i.e., the transmission is in neutral. The second point (t2) is at a time shortly after the first point such that it can be assumed that very little change has occurred in the vehicle rolling, grade or aerodynamic forces. At these two selected points, the above summation reduces to the following equation:

$$F\text{drive}_{(t_2)} - F\text{drive}_{(t_1)} = m(a_{t_2} - a_{t_1})$$

Which, with $F\text{drive}_{(t_1)} = 0$, (during the shifting) reduces to:

$$m = \frac{F drive_{(t_2)}}{a_{t_2} - a_{t_1}}$$

Where,

1. F drive is obtained from the vehicle engine via the SAE J1939 Data Bus that is factored to account for the vehicles drive line efficiency; and
2. The vehicle acceleration a is derived from the ABS steering axle wheel speed sensors and the rolling radii of the tires.

To accommodate changes due to vehicle loading, whenever the vehicle stops (more than momentary) or the system power is switched on, the estimated vehicle mass is set to an initial maximum value (see block 120).

The new determined mass estimate and previous estimate may be combined to provide a new current mass estimate with a weighting factor being assigned to the combined measurements. For example, if the weighting factor is 0.1 or ten percent, the new current mass estimate is equal to 0.1 times the new determined mass estimate plus 0.9 times the prior mass estimate.

In the above formula, if the difference between the acceleration at $t_2$ and the acceleration at $t_1$ is small, a smaller weight is desirably assigned to the new determined estimate when making the combination due to the greater probability of error being introduced by division by a small number. In addition, if the time different between $t_1$ and $t_2$ is large, the influence of other longitudinal force factors becomes greater. Consequently, in such cases, a smaller weight is desirably assigned to the new determined estimate when combining with the previous estimate. A typical clean shift takes about 0.5 to 1 second. If a longer time is taken, the new determined mass estimate is given a lower weight. U.S. Pat. No. 4,941,365 discusses this further.

Critical Acceleration Estimator

In the illustrated form of critical acceleration estimator 20, the approach may be taken that, for a specific class of vehicles, the most significant factor affecting the critical lateral acceleration level or rollover threshold for the vehicle is the center of gravity height of the vehicle. Rather than monitoring the center of gravity height of trucks and the like directly, which, although possible, is less desirable, the approach in one desirable embodiment monitors a surrogate, namely the mass of the vehicle. In general, the more cargo (mass) that the vehicle is transporting, the higher its center of gravity.

The illustrated form of critical acceleration estimator determines the critical acceleration level based on a rule set which is dependent upon the mass of the vehicle. In other applications, other factors may also be included. This rule set may be embodied in a lookup table. In developing the lookup table, an assumed manner of loading the cargo transportation areas of the vehicle may be utilized.

Figure 4:
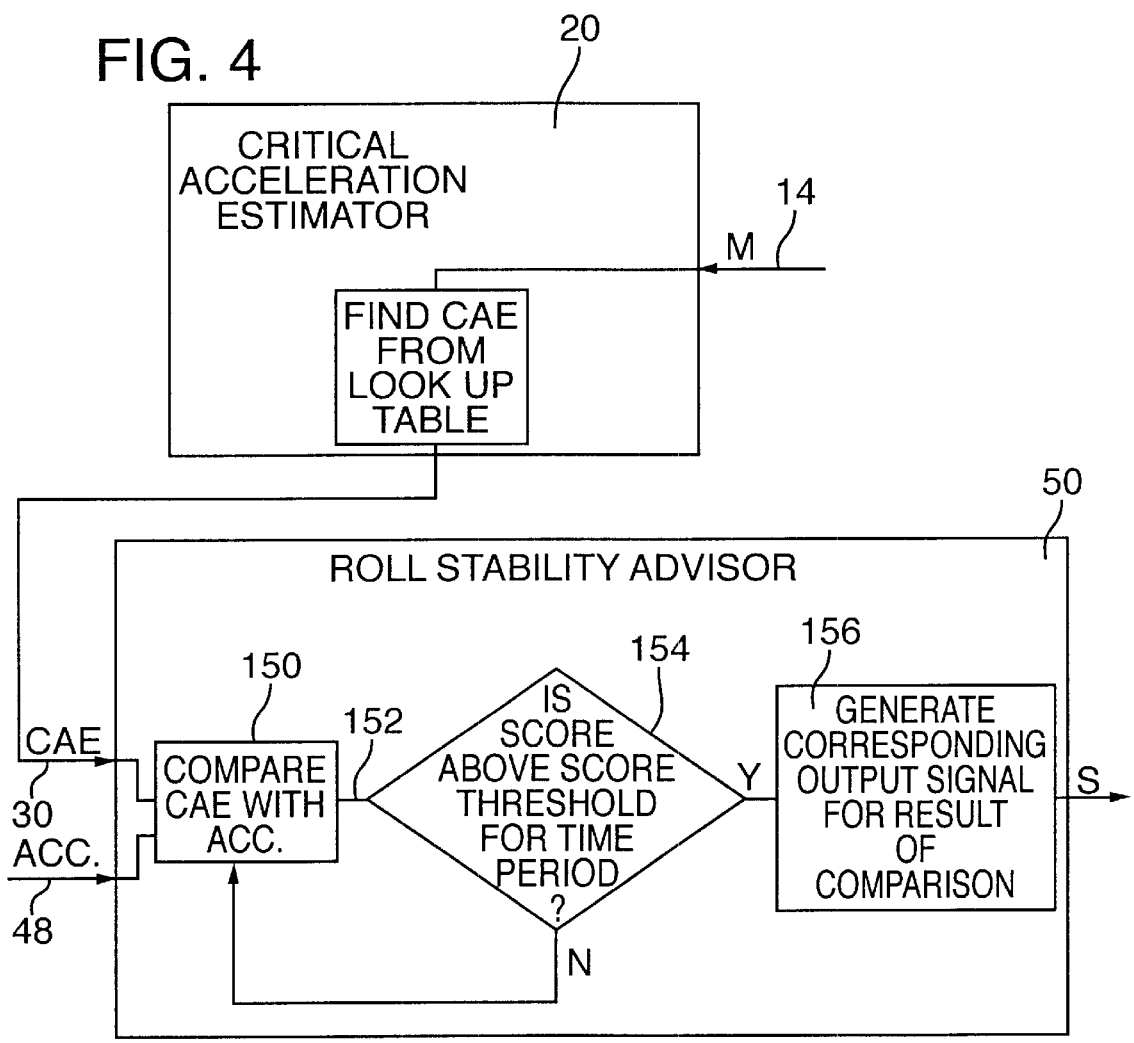
FIG. 4 is a block diagram of a form of critical acceleration estimator and roll stability advisor which may be used in the embodiment of FIG. 1.

With reference to FIG. 4, the illustrated form of critical acceleration estimator looks up a critical accelerated estimate from a lookup table in response to the mass estimate M on line 14. This is typically a computer performed operation.

One formula for determining a critical acceleration level for a vehicle is expressed as follows:

$$A = \frac{CG}{0.5(trackwidth)} \times g$$

wherein

A is the assigned rollover value;

wherein the vehicle has a longitudinal axis and the effective track width is the width between wheels of the vehicle in a direction normal to the longitudinal axis;

wherein g is the gravitational force; and wherein CG is the center of gravity height, which in this case may be dependent upon the assumed manner of loading the vehicle.

In applying this formula, one could assume a center of gravity height for a given type of vehicle. However, the center of gravity height varies significantly with the loading of the vehicle and the nature of the load. For example, an unloaded vehicle can travel around corners much faster than a loaded vehicle without encountered a high rollover risk condition. In addition, the center of gravity is much lower for a dense load, such as steel plates, than for a less dense load, such as cotton bales. Thus, there is a relationship between the mass of the vehicle, the center of gravity of the vehicle, and the critical acceleration that is allowed. This relationship is also impacted by the manner in which the vehicle is loaded.

Figure 5:
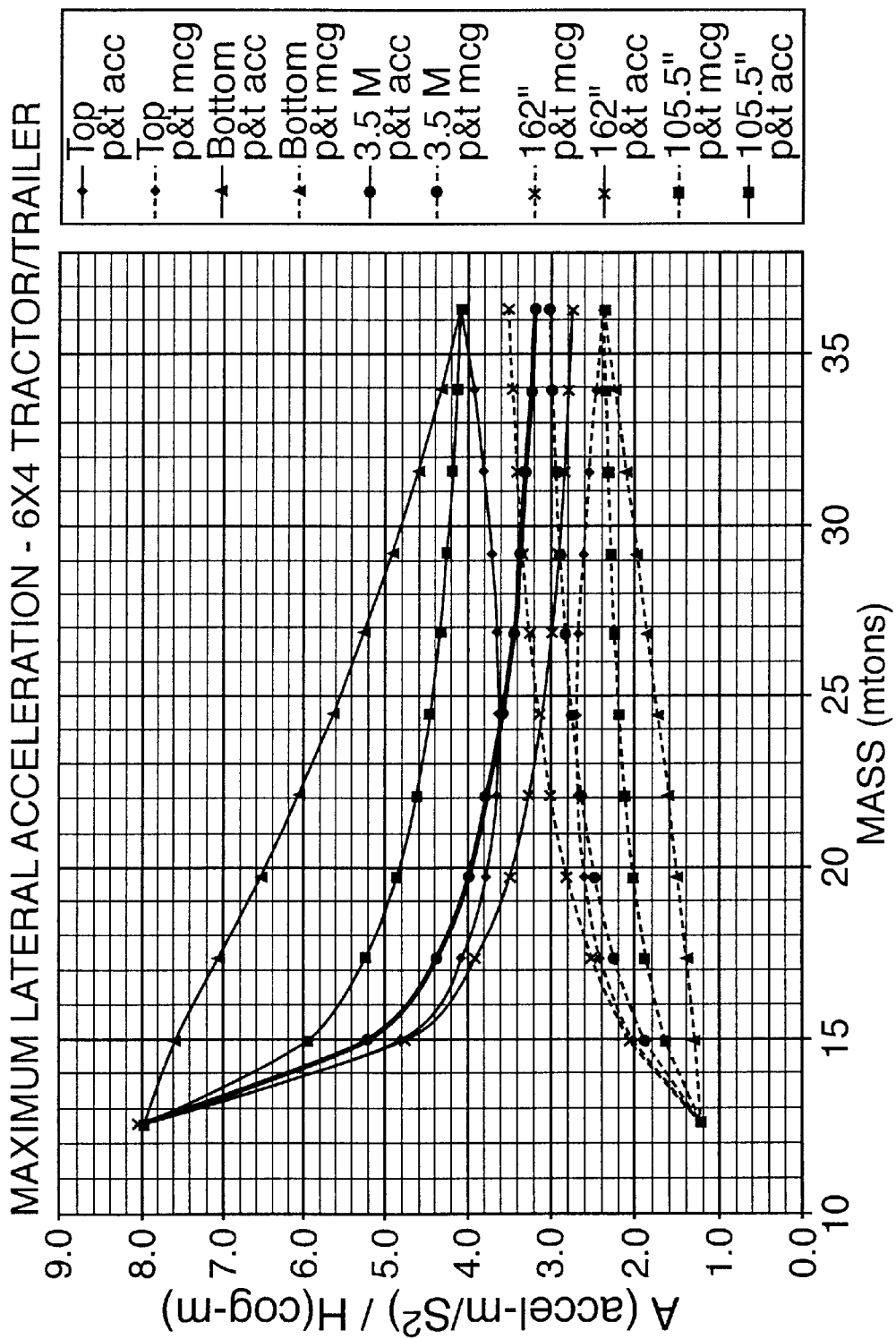
FIG. 5 illustrates various curves of maximum lateral acceleration values for given masses for a specific type of vehicle/trailer configuration and with various assumed loading approaches for loading the cargo area being transported by the vehicle.

The solid curves in the upper section of FIG. 5 illustrate the application of the above formula with various assumed loading approaches for the vehicle. By looking at the mass of the vehicle (for example a mass determined by the vehicle mass estimator), one can find a value of critical acceleration for a particular manner of loading the vehicle. FIG. 5 is a chart for a 6×4 tractor/trailer assembly wherein the tractor is a Class 8 tractor (e.g., a Freightliner Century Classy® tractor) and the trailer comprises a single semi-trailer with two axles in the back. The 6×4 designation refers to a tractor having six wheel ends with four driven and is a three axle vehicle. Similar charts may be determined for other vehicle types. FIG. 5 is a double-data presentation as the lower curves in dashed lines represent the center of gravity height in meters for a given loading pattern.

The chart legend and data on the chart is explained below.

Maximum Lateral Acceleration—6×4 Tractor/Semi-trailer

Assumptions made on vehicle tare weights and configuration.

Vertical Axis

A (lateral acceleration in meters/sec$^2$)

H (height of center of gravity in meters)

Horizontal Axis

Combined vehicle mass (metric tons) of 6×4 Tractor/Semi-trailer. The different curves represent different loading approaches.

Chart Legend p&t acc—payload and trailer calculated lateral acceleration p&t mcg—payload and trailer calculated metric center of gravity Top—values calculated assuming payload is added from the top of the trailer to the load floor of the trailer (top down loading).

Bottom—values calculated assuming payload is added from the load floor of the trailer to the top of the trailer (bottom up loading).

3.5 M—values calculated assuming payload CG is a fixed 3.5 meters (~137.8" or ~11'-6") above the ground (fixed payload).

162"—values calculated assuming payload CG is fixed 162 inches (13'-6" or ~4.1 m) above the ground (fixed payload).

105.5"—values calculated assuming payload CG is a fixed 105.5 inches (8'-9.5" or ~2.7 m) above the ground (fixed payload).

In developing the lookup table for a specified vehicle type, typically one loading pattern is assumed. The 162" loading pattern is the most conservative and results in relatively low critical acceleration values which appear unrealistic as they do not match actual observed driving conditions very closely. At this time, the 105.5" fixed payload curve appears to be most preferred. In addition, in determining the value of critical acceleration from estimated mass, the current approach is to modify the above formula by multiplying the formula times a constant. At present, a constant of 0.85 appears desirable. Thus, the critical acceleration estimates from the lookup table would be 15 percent less than the acceleration indicated by following the curve for the 105.5 inch fixed payload loading pattern.

The formulas and rules for a given form of tractor-trailer combination and/or class of vehicles may be empirically determined by driving the vehicles and recording lateral accelerations which create problems for the vehicle driver in terms of increased rollover risks or using a formula such as expressed above and in FIG. 5. As another option, one may also provide multiple lookup tables depending upon the type of load, with a vehicle operator keying in the load type and the system selecting the appropriate lookup table based on the load type. Other factors may also be considered.

The critical acceleration level is affected by other factors besides the center of gravity height as previously expressed. These factors include, but are not limited to, the degree of lateral load offset, the roll of the suspension, the roll stiffness of the trailer suspension, and other factors. Nevertheless, the above approach of generating critical acceleration estimates based on dynamically estimated mass of the vehicle is highly desirable as it does accommodate changes in vehicle loading patterns, as is the typical case when vehicles are loaded and unloaded between multiple destinations.

The critical acceleration estimate AE for the given determined mass is delivered at output 30 (FIG. 1) to the roll stability advisor 50.

Roll Stability Advisor

As shown schematically in FIG. 1, the roll stability advisor 50 operates using the ACC signal and CAE signal. The roll stability advisor desirably operates after a risky rollover event has occurred to insure that the driver is aware that near rollover conditions were encountered and to possibly recommend a speed reduction to assist in training the driver to avoid these conditions in the future.

As shown schematically in FIG. 1, the illustrated roll stability advisor 50 operates using the ACC signal, representing the determined lateral acceleration of the vehicle, and the CAE signal, representing the critical acceleration estimate. Although this system may continuously warn the driver of risky rollover events, in its most desirable form the system operates to warn the driver after a risky rollover event has occurred to provide the driver with an indication that a near rollover condition was encountered. The system may also recommend a speed reduction to the driver to avoid these conditions in the future. A risky event is typically deemed over when the lateral acceleration levels (ACC) has dropped below the critical acceleration level (CAE) and more desirably below some fraction or percentage of the critical acceleration level, such as for a time period. Consequently, the driver is not distracted by rollover warning messages during times when the driver is dealing with potentially hazardous rollover conditions.

With reference to FIG. 4, the roll stability advisor in this example compares the ACC or lateral acceleration level signal with the critical acceleration estimate (CAE). Additionally, a digital lowpass filter is desirably applied to the ACC signal. This reduces the possibility that short duration-high lateral acceleration events (that are not risky rollover conditions) will produce a rollover advisory message. As previously indicated, typically rollover conditions must exist for a period of time (e.g., a second) before there is any realistic risk of a vehicle rolling over.

This initial filtering may be accomplished using the following formula:

$$A_{RSA_t} = \frac{A_{CC} + 127(A_{RSA_{t-1}})}{128}$$

In the above formula, $A_{RSA}$ is equal to the signal that is actually compared with the CAE signal. However, in FIG. 4 at block 150 for convenience, the comparison is indicated without substituting RSA for ACC. The ACC signal is the signal from line 48. In addition, the $A_{RSA_{t-1}}$ signal is the $A_{RSA}$ value at the previous cycle. Every three milliseconds is an exemplary cycle. This formula results in a time constant of about 800 milliseconds. Once this additional conditioning or filtering has been applied to the lateral acceleration signal ACC, the resultant signal (indicating as ACC' in FIG. 4) is again compared to the current estimate of the critical acceleration level or CAE signal. Various comparison approaches may be used. For example, the difference between the CAE signal and ACC' signal may be determined with the difference indicating the closeness of the lateral acceleration to the critical acceleration level. However, in a specific approach, the ratio of the ACC' signal to the CAE signal is obtained and multiplied by 100 to produce a score which is delivered via line 152 to block 154 in FIG. 4. At block 154 the score is compared with at least one score level, and in this example, three such levels. Each of the levels corresponds to a different rollover risk. For example, the first level may correspond to a low, but risky rollover category or condition; the second level may correspond to a higher rollover risk category or condition; and the third level may correspond to an even higher rollover risk category or condition. These levels may be predetermined. The particular levels may also be variable. If the score determined at block 154 exceeds any of these levels, a variable is updated to indicate the highest level or risk category that was exceeded. At the end of the rollover advisory event, such as determined by the score dropping below the lowest of the risk levels, e.g., for predetermined time period, at block 156 an appropriate message request signal S is generated for sending to the driver message manager 54 (FIG. 1). The message request may include both a request for an indication of a specific rollover risk level as well as for an indication of a speed reduction recommendation.

The speed reduction recommendation may be calculated by the roll stability advisor, or example at block 156. The speed reduction recommendation, in one example, is calculated from the following equations:

First, the radius $R_i$ that the vehicle was traveling is determined, based on the following:

$$R_i = \frac{V_{max}^2}{a}$$

Where, $R_i$ is the indicated radius of the vehicle $V_{max}$ is the vehicle speed when the RSA Score is at its maximum a is the acceleration when the RSA Score is at its maximum Second, the maximum speed ($V_{rec}$) that does not produce a message request based on the indicated radius ($R_i$) and the lowest of the predetermined acceleration levels ($a_{L1}$) is expressed as follows:

$$V_{rec} = \sqrt{R_i * a_{L1}}$$

wherein * indicates multiplication

Combining equations 1) and 2) and subtracting this from $V_{max}$ gives the recommended speed reduction $\Delta V_{rec}$ as:

$$\Delta V_{rec} = V_{max} - V_{rec} = V_{max} * [1 - \sqrt{\{a_{L1}/a\}}]$$

To execute this calculation efficiently on a microprocessor, the square root operation is replaced by linearizing the above equation 3) over the region of interest—e.g., from about 0.7 to 1.3 times the critical acceleration level. In addition, to eliminate speed recommendations with very low values (that occur with low speed risky maneuvers) and are not creditable to drivers, a 3 mph or other increment may be added to the recommended speed. With these modifications, the actual recommended speed reduction value is calculated using the following linearized equation:

$$\Delta V_{rec} = \frac{5}{8} * V_{max} * \{-1 + a_{L1}/a\} + 3$$

Figure 6:
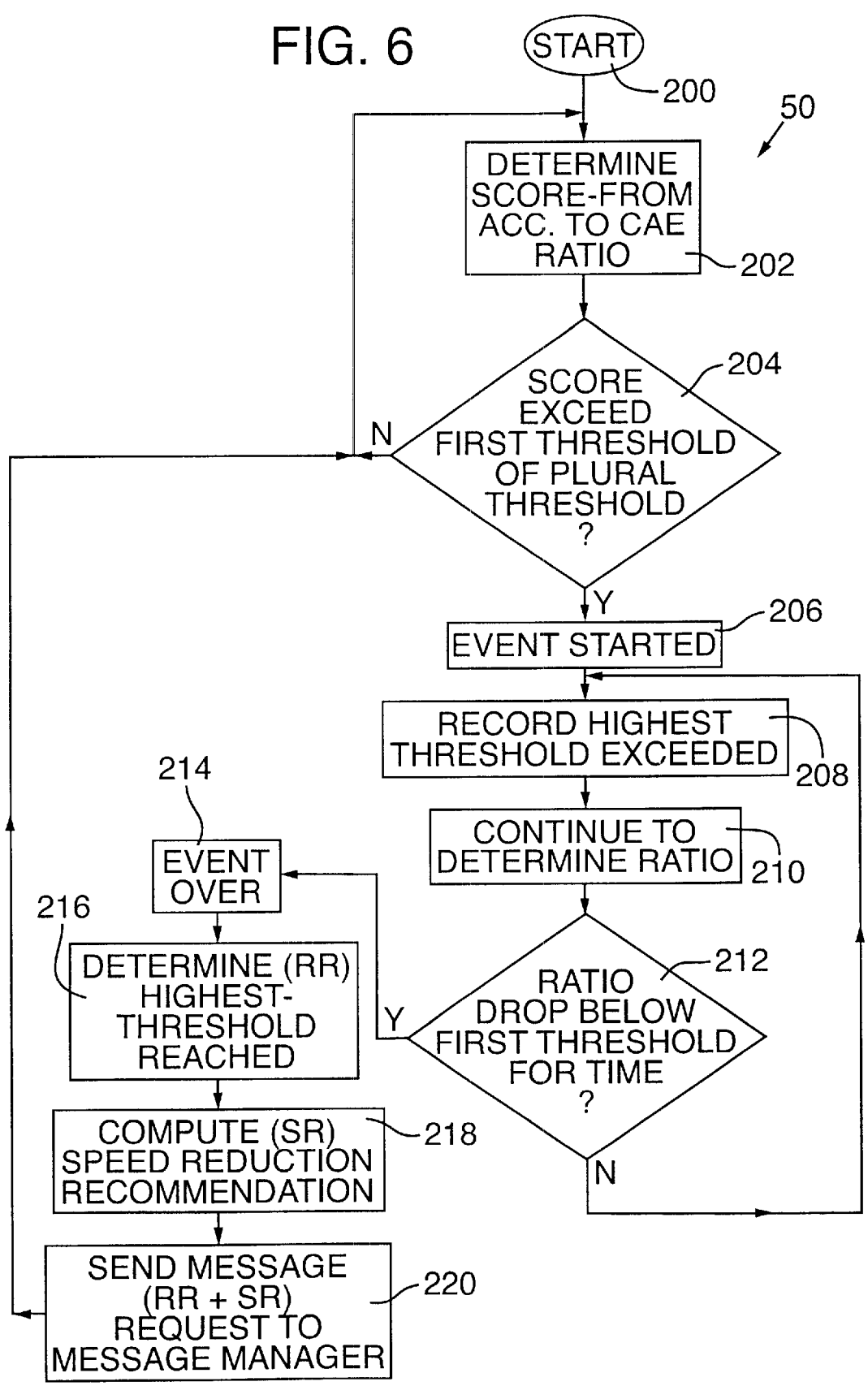
FIG. 6 illustrates one approach for comparing critical acceleration estimates with lateral acceleration values to determine whether a rollover risk of an unacceptable level has occurred.

FIG. 6 illustrates one specific exemplary logic that may be followed by the roll stability advisor of FIG. 4.

From a start block 200 a block 202 is reached at which the score is determined from the ACC and CAE ratio or more specifically from the ACC' to CAE ratio with the ACC' signal being indirectly derived from the ACC signal. At block 204 the question is asked as to whether the first (lowest risk) threshold of plural thresholds is exceeded. If the answer is "yes", the start of rollover advisory event is determined at block 206. At block 208 the highest threshold exceeded during the event is recorded. At block 210, (ACC' to CAE) the ratio is continued to be determined. At block 212, a determination is made as to whether the ratio has dropped below the first threshold level for a predetermined time. This predetermined time may be varied. This time period also need not be predetermined. If the answer is "no", the cycle returns to the input side of block 208. If the ratio has dropped below the first threshold at block 212, a block 214 is reached indicating that the rollover advisory event has ended. In this case, at block 216 a rollover risk signal is determined corresponding to the highest threshold reached during the evaluation. At block 218 a speed reduction recommendation is computed, if any, speed reduction recommendation is to be delivered to the driver. At block 220 the message request is sent to the message manager and the procedure continues with an evaluation of the next score.

Driver Message Manager and Indicator

The signal S from the roll stability advisor 50 (FIG. 1) may be delivered directly to an indicator for indicating the existence of a high risk rollover event. However, in the illustrated embodiment, a driver message manager 54 is employed. The driver message manager may be a conventional message manager such as currently found on Freightliner Century Class® trucks, which are commercially available.

The message manager 54 receives message requests from the roll stability advisor 50 and also from the hard-braking event detector (described in greater detail below) and determines which, if any, of these message requests to forward to the driver message display. From these signals, the message manager determines, desirably at the conclusion of roll advisory events and hard-braking events, the highest severity level that has occurred and generates the appropriate message request. This information is then transmitted to a driver message display, such as via a SAEJ1587 datalink.

As shown in FIG. 10, one form of indicator 58 may be a driver message display of the type now found in commercially available Freightliner Century Class® vehicles. This display includes a keypad or other input device to 240. The illustrated keypad has a plurality of buttons or keys with one being indicated by an icon, such as a diamond symbol at 242. This particular indicator includes a central processing unit 244 and associated memory 246. In addition, an alphanumeric display 250 is coupled to the CPU. The keypad and display may be mounted to a portion of the dash of the vehicle, indicated at 252, in a position where the display is readily observable by the vehicle operator. For example, the display may be positioned in front of the driver where it can be viewed through a gap in the steering wheel of the vehicle. More specifically, the display in commercially available Freightliner Century Class® vehicles is located in the instrument cluster above the vehicle speedometer and tachometer. As a result, the driver can frequently review the display as the display is located just below the driver's normal driving forward field of view.

During normal operation, this display 250, which may be a microprocessor controlled two line by twenty line character alphanumeric display, present vehicle operating information to the driver. However, when specific SAEJ1587 datalink messages are received, unique predefined text messages are displayed to the driver. For example, specific messages may be displayed to alert the driver to the presence of rollover risky driving conditions and hard-braking events so as to alert the driver to avoid these conditions in the future. Speed reduction recommendations may also be provided to the driver.

The system may also be used alone or in combination with a rollover control device which is triggered in response to the level of the ACC signals. That is, if the ACC signals rise too close to the CAE signal (typically at a higher level than required to indicate a roll stability advisory event), the roll stability control device may be activated to cause control of the vehicle to be taken away from the driver. For example, a signal may be sent to the electronic control unit of the engine to reduce engine power and to apply the engine brake to slow the vehicle down. When the vehicle is then operated again under stable conditions, the engine brake is released and power is restored to the engine. Again, such a roll stability control system may be provided independently of the roll advisory system and is not required for a roll stability advisory and hard-braking event systems discussed herein.

The message manager receives message requests from the roll stability advisor and hard-braking event detectors and determines which if any of these message requests to forward to the driver message display. Predetermined message priority levels and vehicle speeds, along with the time since the last message of the same priority was displayed to the driver, may be employed to make this determination. The message priorities chosen are:

| Priority Level | Message |
| --- | --- |
| 1 | Roll Advisor & Roll Control (if included) Inoperative-fault detected |
| 2 | Roll Stability Control (if included) |
| 3 | Roll Stability Advisor-Level 3 |
| 4 | Roll Stability Advisor-Level 2 |
| 5 | Roll Stability Advisor-Level 1 |
| 6 | Hard-braking Event Detector-Level 3 |
| 7 | Hard-braking Event Detector-Level 2 |
| 8 | Hard-braking Event Detector-Level 1 |

Priority level 1 and 2 messages requests are forwarded to the driver message display as soon and as often as they are received. Roll Stability Control triggers a message indicating that control of the vehicle has been taken away from the driver. Because priority level 3–8 messages refer to events that have already occurred, the vehicle speed and time since the last message of the same priority was displayed to the driver are applied to these message requests. Typically, the predetermined cutoff speed for these messages is set between 10 and 20 mph and the time between repeat messages is set for one or two minutes. This is done to avoid annoying drivers with repeat or inconsequential messages.

Figure 7A:
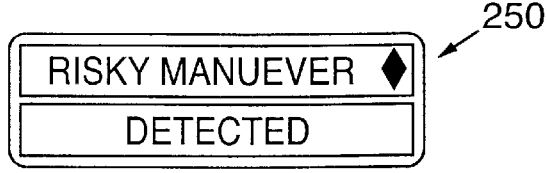
FIGS. 7A–7C illustrate exemplary messages which may be displayed to a vehicle operator to indicate the level of rollover risk and also to indicate specific speed reductions which correspond to the indicated risk levels.
Figure 7B:
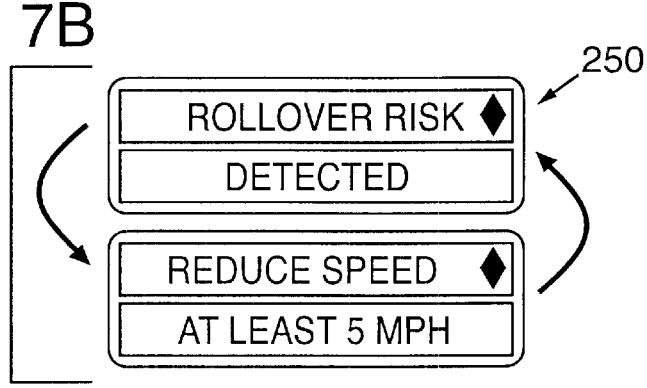
Figure 7C:
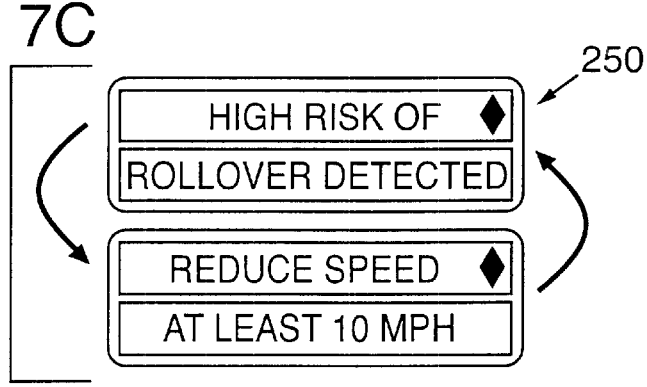

FIGS. 7A–7C illustrate exemplary messages which may be provided to the vehicle operator upon the occurrence of rollover risk conditions.

These conditions again can be indicated with lights, auditory alarms, backlite displays, plural lights. Variations in the visual and auditory signals being used to indicate the severity of the risks.

FIG. 7A illustrates representative messages for a lowest risk rollover advisory condition. In FIG. 7A, the driver is alerted to the fact that a risky maneuver has been detected. The driver may also be alerted by a short auditory signal (e.g., one second) to indicate that this has occurred. The diamond symbol on the display is an optional icon that corresponds to the icon on a key. The driver would depress the key on the keypad or other entry device with the matching icon to acknowledge that the driver has received the message a risky maneuver has occurred. The driver may be prompted by a message to acknowledge the alert.

FIG. 7B illustrates representative messages for a second category or level of rollover risk of a greater risk than that depicted in 7A. In the FIG. 7B messages, one display indicates that a rollover risk has been detected. A second display indicates a speed reduction recommendation, in this case in miles per hour. The speed reduction recommendation would be computed in the illustrated embodiment and displayed accordingly. Alternatively, a certain fixed level of reduction can be recommended in the event the rollover risk falls into this particular category. To alert the driver to these conditions, the display in the upper portion of FIG. 7B and in the lower portion of FIG. 7B may be alternated or flashed. The flashing rate may be at one level for this degree of risk. In addition, an auditory signal may be provided, for example of ten second duration (e.g., longer than the lower risk message). These signals may be repeated until the driver acknowledges receipt of the information by pushing the keypad button corresponding to the diamond icon.

FIG. 7C illustrates representative messages for a third or highest risk of rollover category indication in the event a three level, warning system is used. Again, the displays in the upper portion of FIG. 7C and lower portion of FIG. 7C may be alternated to alert the driver. The flashing rate may be higher than the case in FIG. 7B to increase the urgency of the information. In addition, an auditory signal, for example of twenty seconds duration to indicate the higher intensity of risk, may also be provided to the driver. The intensity of the signals or other differences may be provided to indicate the variations in risk levels. The speed reduction in the case of FIG. 7C is greater than speed reduction recommendation in the case of FIG. 7B. Again, this speed reduction recommendation may be varied. These messages are repeated and the auditory signal continues typically until such time as the driver acknowledges the receipt of the message by pushing the symbol containing key, in this case the diamond icon key, or a time out is reached.

Figure 9A:
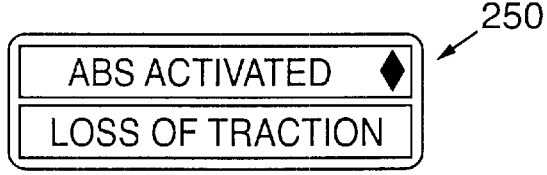
FIGS. 9A–9C illustrate exemplary message which may be displayed to a vehicle operator to indicate hard-braking event levels.
Figure 9B:
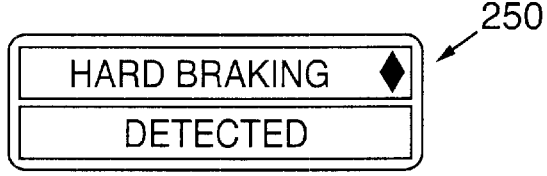
Figure 9C:
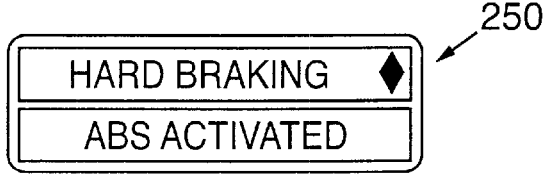

FIGS. 9A, 9B and 9C illustrate representative displays for hard-braking event indications of various levels. In this example, the lowest level of risk is shown in FIG. 9A, a higher level of risk is shown in FIG. 9B, and the highest level of risk in this case is shown in FIG. 9C. Again, these displays are representative examples. Also, more and fewer risk levels may be employed.

Hard-Braking Event Detector

Because hard-braking can lead to loss of vehicle control and rollover, a hard-braking event detector 60 may be included as part of the roll advisor system, or independently provided. The hard-braking event detector (HBED) 60 (FIG. 1), in this example, employs information from the ABS system. In this specific example, three HBED events or risk levels are defined as follows:

1. If the braking at one or more of the ABS controlled wheels on the vehicle is being modulated by the ABS system, this indicates that the drivers braking command exceeds the available traction at one or more wheels on the vehicle. Typically, when this condition occurs, slippery road conditions exist and/or the vehicle is lightly loaded. This is the lowest level HBED event.

2. The second level HBED event is when the driver's braking command produces a very rapid deceleration of the vehicle without any of the ABS controlled wheels on the vehicle requiring ABS modulation. Typically, the threshold for this type of hard-braking event is about 0.3 g's for a duration of one or more seconds. The actual threshold level and duration are parameters that may be entered into system software.

3. The third and most sever of the HBED events is when both of the events described in paragraphs 1 and 2 above occur simultaneously. This indicates a very severe event at or near the limit of the current vehicle/loading/road surface conditions.

As soon as a hard-braking event is detected, in one embodiment, a variable is updated to indicate the highest-level event that has occurred. At the end of the event (as determined by no new hard-braking events being detected for a time period, which may be variable and may be of a predetermined duration) a message request is forwarded to the message manager. In addition, to avoid hard-braking event messages being requested when hard-braking is the correct driver action, desirably no hard-braking message requests are forwarded if the lateral acceleration during a hard-braking event exceeded a predetermined level. Although this is an independent program parameter, this level is typically set at or near the level of the lowest risk rollover risk category.

With reference to FIG. 8, the exemplary hard-braking event detector 60 and its logically operation is illustrated in flow chart format. From start block 300, a block 302 is reached. Block 302 indicates that the ABS signals are being monitored. At block 304, a question is asked as to whether one or more of the ABS system control wheels is being modulated by the ABS system. In addition, at block 306, a determination is made as to whether braking forces are being applied that produce deceleration at a rate exceeded a deceleration rate threshold for a time exceeding a deceleration time threshold. The deceleration rate threshold and deceleration time threshold may be varied. The outputs from these blocks 304 and 306 are delivered to a block 308 at which a determination is made as to whether a hard-braking event has commenced and what level hard-braking event has been reached. The highest risk level corresponding to a "yes" answer from each of the blocks 304, 306, the lowest risk level corresponding to a "yes" answer from block 304 and a "no" answer from block 306; and an intermediate level of hard-braking event corresponding to a "yes" answer from block 306 and a "no" answer from block 304. At block 310, a start of hard-braking event (HBE) is indicated upon the occurrence of a "yes" answer from either block 304 or block 306. At block 312, the hard-braking event information is updated to indicate the highest level of hard-braking event that has been deleted (e.g., one, two or three with three being the highest level). At block 312, the "yes" answers are checked from blocks 304 and 306 to determine if they are both "no". If they are not both "no", at block 314 a determination is made that the hard-braking event has not ended and processing continues at the input to block 312. When the event is over (no hard-braking conditions are being determined, e.g., for a time period) at block 316 a determination is made as to the appropriate HBE message.

At block 318 a determination is made as to whether the ACC signal exceeded a threshold (which may be set equal to the lowest threshold level for a rollover advisory event). Alternatively, a processed signal, such as the ACC' signal may be used in making this determination. If the answer at block 318 is "no", the appropriate message indication is sent, as indicated at block 320, to the message manager. If the answer at block 318 is "yes", the process continues to block 302. In this case, no hard-braking event message is typically sent to the message manager. That is, at certain times lateral accelerations in excess of a threshold are properly responded to by hard-braking events. Consequently, the system, in the case where this optional feature is included, does not warn a driver of hard-braking events when the driver is expected to operate the vehicle under such hard-braking conditions.

Figure 11A:
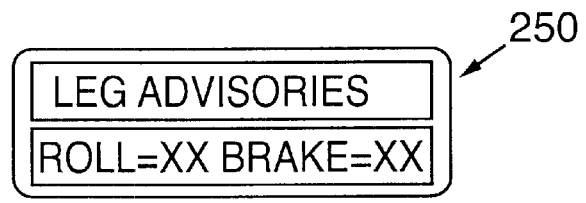
FIGS. 11A and 11B illustrate exemplary messages which may be displayed to indicate numbers of the hard-braking events and rollover advisories that occurred during a vehicle trip and/or a segment of a vehicle trip.
Figure 11B:
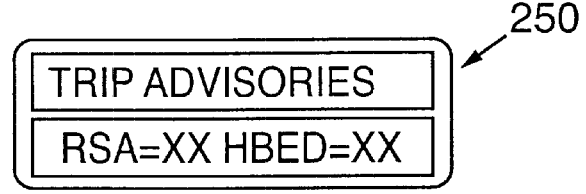

FIGS. 11A and 11B illustrate displays which may be generated at any desirable time, for example at the end of a leg or segment of a trip or following a trip. For example, a conventional data logger (such as found on commercial available Freightliner Century Class® trucks) may be used to log rollover advisories as they occur and hard-braking events as they occur. Display FIG. 11A indicates a display which calls up all of the rollover advisory events (the total) that have taken place during a segment of a trip and the number of hard-braking events (total) that have taken place during this trip segment. FIG. 11B illustrates a display of the total of such events during the entire trip.

Having illustrated and described the principles of our invention with reference to several preferred embodiments, it should be apparent to those of ordinary skill in the art that the invention may be modified in arrangement and detail without departing from such principles. We claim as our invention all such modifications as fall within the scope and spirit of the following claims.

We claim:

1. A method of advising a vehicle operator of vehicle driving conditions which create an increased risk of rollover of the vehicle, the method comprising:
   determining the mass of the vehicle;
   determining a rollover acceleration value which corresponds to the mass of the vehicle;
   comparing the rollover acceleration value with a lateral acceleration value which corresponds to the lateral acceleration of the vehicle; and
   indicating a rollover risk based upon the comparison.

2. A method according to claim 1 wherein the act of determining the mass of the vehicle comprises the act of estimating the mass of the vehicle.

3. A method according to claim 1 wherein the act of determining the mass of the vehicle comprises estimating the mass of the vehicle at least at selected times when the vehicle is being driven.

4. A method according to claim 1 in which the act of determining the rollover acceleration value comprises assigning a rollover acceleration value based upon a rule set which assigns rollover acceleration values based upon the determined mass of the vehicle.

5. A method according to claim 4 in which the rule set is embodied in at least one look-up table.

6. A method according to claim 4 in which the vehicle is transporting a cargo area, the cargo area being located in a trailer or trailers being towed by the vehicle or being carried by the vehicle, and in which the act of determining the rollover acceleration value comprises assigning a rollover value based upon an assumed manner of loading the cargo area being transported by the vehicle.

7. A method according to claim 1 in which the act of comparing comprises assigning a rollover risk level based upon the extent to which the lateral acceleration value approaches the rollover acceleration value.

8. A method of advising a vehicle operator of vehicle driving conditions which create an increased risk of rollover of the vehicle, the method comprising:
   determining the mass of the vehicle;
   determining a rollover acceleration value which corresponds to the mass of the vehicle;
   comparing the rollover acceleration value with a lateral acceleration value which corresponds to the lateral acceleration of the vehicle;
   indicating a rollover risk based upon the comparison; and
   in which the indicating act comprises indicating a rollover risk level to the vehicle operator while the vehicle is being driven and following the conclusion of vehicle driving conditions which created the increased risk of rollover to assist in training the driver to learn to avoid the increased rollover risk driving conditions.

9. A method according to claim 8 in which at least two rollover risk levels are indicated to the vehicle operator, the method also including the act of indicating a recommended speed reduction which differs depending upon the rollover risk level to assist in training the driver in how to respond to the driving conditions which led to the indication of the rollover risk level.

10. A method according to claim 8 in which the act of indicating a rollover risk level comprises selectively indicating to a vehicle operator a level of rollover risk in the form of an alphanumeric message.

11. A method according to claim 8 in which the comparing act comprises determining a ratio of the lateral acceleration value to the rollover acceleration value and assigning the rollover risk to a rollover risk category based upon the ratio.

12. A method of advising a vehicle operator of vehicle driving conditions which create an increased risk of rollover of the vehicle, the method comprising:
   determining the mass of the vehicle;
   determining a rollover acceleration value which corresponds to the mass of the vehicle;
   comparing the rollover acceleration value with a lateral acceleration value which corresponds to the lateral acceleration of the vehicle;
   indicating a rollover risk based upon the comparison;
   in which the comparing act comprises determining a ratio of the lateral acceleration value to the rollover acceleration value and assigning the rollover risk to a rollover risk category based upon the ratio;
   wherein there are at least two such rollover risk categories;
   the method including the act of determining a proposed reduction in vehicle speed in the event the rollover risk falls into at least one of the at least two categories; and
   wherein the indicating act comprises indicating a recommended reduction in speed to the vehicle operator in addition to indicating the rollover risk at a time following the conclusion of driving conditions which led to the rollover risk falling into at least one of the at least two categories.

13. A method according to claim 12 including the act of indicating at least two recommended reductions in speed, a first of such recommended reductions in speed being indicated in the event the rollover risk falls into one of the at least two categories and the second recommended reduction in speed being indicated in the event the rollover risk falls into another of the at least two categories.

14. A method according to claim 13 in which the magnitude of the speed reduction set forth in the first and second speed reduction recommendations is variable.

15. A method according to claim 14 wherein there are at least three such categories of rollover risk which are indicated and wherein no recommended reduction in speed is made in the event the risk falls into a first of the at least three categories, the first category corresponding to a lower risk than the other categories.

16. A method according to claim 15 in which the indicating act comprises providing the vehicle operator with an alphanumeric message indicating the category of rollover risk at a time following the conclusion of driving conditions which resulted in the indication of rollover risk.

17. A method according to claim 16 including the act of flashing the alphanumeric message at a first rate of flashing if the rollover risk is in one category and at a second rate of flashing which is greater than the first rate of flashing in the event the rollover risk is in another category which corresponds to a rollover risk which is higher than the first category of rollover risk.

18. A method according to claim 17 including the act of providing an audible signal which varies depending upon the category of rollover risk.

19. A method of advising a vehicle operator of vehicle driving conditions which create an increased risk of rollover of the vehicle, the method comprising:
   determining the mass of the vehicle;
   determining a rollover acceleration value which corresponds to the mass of the vehicle;
   comparing the rollover acceleration value with a lateral acceleration value which corresponds to the lateral acceleration of the vehicle; indicating a rollover risk based upon the comparison; and wherein the comparing act comprises generating a rollover risk score from a ratio of the lateral acceleration value to the rollover acceleration value.

20. A method of advising a vehicle operator of vehicle driving conditions which create an increased risk of rollover of the vehicle, the method comprising:

determining the mass of the vehicle;

determining a rollover acceleration value which corresponds to the mass of the vehicle;

comparing the rollover acceleration value with a lateral acceleration value which corresponds to the lateral acceleration of the vehicle;

indicating a rollover risk based upon the comparison;

in which the vehicle has an automatically modulated braking system which controls the braking at least at selected wheels of the vehicle, the control of braking at a wheel being modulated under certain wheel slip conditions, the automatically modulated braking system producing first signals indicating the modulation of the wheels, the automatically modulated braking system also producing second signals which indicate the rate at which the acceleration of the vehicle is taking place, the method comprising:

determining from the first signals whether one or more wheels is being modulated by the automatically modulated braking system, such condition being a wheel modulation hard-braking event;

determining from the second signals whether braking is producing deceleration at a rate which exceeds a first deceleration rate for a time which exceeds a first time period, such condition being a rapid deceleration hard-braking event;

indicating a first level of hard-braking event in the event a wheel modulation hard-braking event is detected without the detection of a rapid deceleration hard-braking event;

indicating a second level of hard-braking event in the event a rapid deceleration hard-braking event is determined without the occurrence of a wheel modulation hard-braking event; and indicating a third level of hard-braking event in the event both the modulation wheel hard-braking event and rapid deceleration hard-braking events have occurred.

21. A method according to claim 20 in which the acts of indicating the occurrence of first, second and third hard-braking event levels is accomplished after braking conditions have concluded which led to the determination of a hard-braking event, whereby the indication is useful in training the vehicle operator to avoid driving conditions which lead to hard-braking events.

22. A method according to claim 20 including the act of determining the commencement of a hard-braking event upon a determination that at least one of the first, second and third hard-braking event levels have been reached and determining the end of a hard-braking event when all of the first, second and third levels are no longer present; and indicating to the vehicle operator the hard-braking event level that was determined to exist during the hard-braking event, the act of indicating taking place following the end of the hard-braking event.

23. A method according to claim 22 in which the act of indicating the hard-braking event level is blocked for events in which the lateral acceleration value exceeds a predetermined threshold.

24. A method according to claim 22 in which a priority is assigned to the indication of rollover risk and hard-braking events.

25. A method according claim 24 in which the indicating act includes the act of selectively indicating the number of hard-braking event and number of rollover risk events that have taken place during a vehicle trip, the rollover risk events corresponding to events in which rollover risk exceeded a rollover threshold.

26. A method according to claim 25 in which the indicating act includes the act of indicating the number of rollover risk events that have been indicated and the number of hard-braking events that have been indicated during a segment or leg of a vehicle trip.

27. A method of advising a vehicle operator of the occurrence of hard-braking events, the vehicle having an automatically modulated braking system which controls the braking at least at selected wheels of the vehicle, the control of braking at a wheel being modulated under certain wheel slip conditions, the automatically modulated braking system producing first signals upon modulation of the wheels of the vehicle, the automatically modulated braking system also producing second signals which indicate the rate at which the acceleration of the vehicle is taking place, the method comprising:

determining from the first signals whether one or more wheels is being modulated by the automatically modulated braking system, the modulation of at least one wheel being a wheel modulation hard-braking event;

determining from the second signals whether braking is producing deceleration at a rate which exceeds a first deceleration rate for a time which exceeds a first time to thereby determine the occurrence of a rapid deceleration hard-braking event;

indicating a first level of hard-braking event in the event a wheel modulation hard-braking event is detected without the detection of a rapid deceleration hard-braking event;

indicating a second level of hard-braking event in the event a rapid deceleration hard-braking event is determined without the occurrence of a wheel modulation hard-braking event; and indicating a third level of hard-braking event in the event both the modulation wheel hard-braking event and rapid deceleration hard-braking events have occurred.

28. A method according to claim 27 in which the acts of indicating the occurrence of first, second and third hard-braking event levels is accomplished after braking conditions have concluded which led to the determination of a hard-braking event, whereby the indication is useful in training the vehicle operator to avoid driving conditions which lead to hard-braking events.

29. A method according to claim 27 including the act of determining the commencement of a hard-braking event upon a determination that at least one of the first, second and third hard-braking event levels have been reached and determining the end of a hard-braking event when all of the first, second and third levels are no longer present; and indicating to the vehicle operator the hard-braking event level that was determined to exist during the time of the event, the act of indicating taking place following the end of the hard-braking event.

30. A method according to claim 29 in which the act of indicating the hard-braking event level is blocked in the event the lateral acceleration value exceeds a predetermined threshold.

31. A method according to claim 30 in which a priority is assigned to the hard-braking events, with the third level being higher than the second level and the second level being higher than the first level.

32. A method according claim 30 in which the indicating act comprises the act of selectively indicating the number of hard-braking events that have taken place during a vehicle trip.

33. A method of advising a vehicle operator of a course of action upon the occurrence of conditions which create an increased risk of rollover of the vehicle, the method comprising:

evaluating the risk of vehicle rollover as a vehicle is being driven;

determining a reduction in vehicle speed recommendation which varies with the evaluated risk of vehicle rollover;

indicating the recommended reduction in speed recommendation to the vehicle operator;

in which the recommended reduction in speed recommendation is indicated to the vehicle operator following the conclusion of driving conditions which led to the risk of vehicle rollover being at least at a first threshold value;

in which the act of evaluating the risk of a vehicle rollover includes the act of assigning at least two risk categories based on the evaluated risk of vehicle rollover; and wherein the act of determining a reduction in speed recommendation comprises varying the reduction in speed recommendation depending upon the category in which the evaluated risk falls.

34. A method according to claim 33 wherein the recommended speed reductions are of specified speed magnitude reductions in miles per hour or kilometers per hour.

35. A method according to claim 34 wherein there are at least three risk categories of higher to lower risk;

wherein in the event the evaluation of the risk of vehicle rollover determines a rollover risk of the highest risk category, a first reduction in vehicle speed recommendation is determined; and wherein in the event the evaluation of the risk of vehicle rollover determines a rollover risk of a category of risk which is lower than the highest risk category, a second reduction in vehicle speed recommendation is determined which is lower speed reduction recommendation made by the first reduction in vehicle speed recommendation.

36. A method according to claim 34 wherein the magnitude of the speed reduction set forth in the speed reduction recommendation is variable.

37. A method according to claim 36 in which the act of indicating the recommended reduction in speed recommendation comprises displaying a recommended speed reduction in alphanumeric characters.

38. A method according to claim 37 including the act of displaying a message in alphanumeric characters which corresponds to the category of rollover risk.

39. A method of advising a vehicle operator of vehicle driving conditions which create an increased risk of rollover of the vehicle, the method comprising:

determining the mass of the vehicle by repeatedly estimating the mass of the vehicle while the vehicle is being driven;

determining a rollover acceleration threshold value based upon a rule set which assigns rollover acceleration threshold values based upon the determined mass of the vehicle, the rule set being embodied in at least one look-up table;

wherein the vehicle is transporting a cargo area, the cargo area being located in a tailer or trailers being towed by the vehicle or being carried by the vehicle, and in which the act of determining the rollover acceleration threshold value comprises assigning a rollover threshold values to the lookup table based upon an assumed manner of loading the cargo area being transported by the vehicle;

determining a lateral acceleration value which corresponds to the lateral acceleration of the vehicle;

comparing the rollover threshold value and the lateral acceleration value and assigning a rollover risk based upon the extent to which the lateral acceleration value approaches the rollover acceleration threshold value;

wherein at least two rollover risk levels are assigned;

selectively indicating the rollover risk level to the vehicle operator, selectively indicating to the vehicle operator a recommended speed reduction of a first amount for a rollover risk at a first level and a recommended speed reduction of a second amount for a rollover risk at a second level which differs from the first level, the selective indications being made to the vehicle operator as rollover advisories after the end of driving conditions which resulted in the assigning of the rollover risk levels;

the act of selectively indicating comprising flashing a rollover risk message at a first rate of flashing if the rollover risk is of one level and at a second rate of flashing which is greater than the first rate of flashing in the event the rollover risk is at a second level which is greater than the first level;

wherein the vehicle has an automatically modulating braking system which controls the braking at least at selected wheels of the vehicle, the control of braking at a wheel being modulated by the automatically modulating braking system under certain wheel slip conditions, the automated braking system producing modulation braking signals in response to modulation of braking of wheels by the automated braking system, the automated braking system also providing rapid deceleration signals which indicate the rate at which the deceleration of the vehicle is taking place, the method comprising the acts of determining from the modulation braking signals whether one or more wheels is being modulated by the automated braking system, which corresponds to a wheel modulation hard-braking event and determining from the rapid deceleration braking signals whether braking is producing deceleration at a rate which exceeds a first rate for at least a first time period to thereby indicate a rapid deceleration hard-braking event;

determining a first level of hard-braking event in the event a wheel modulation braking event is detected without the detection of a rapid deceleration braking event;

determining a second level of hard-braking event in the event a rapid deceleration hard-braking event is detected without the occurrence of a wheel modulation hard-braking event;

determining a third level of hard-braking event in the event both the modulation wheel hard-braking event and rapid deceleration hard-braking event have occurred;

determining the commencement of individual hard-braking events upon a determination that at least one of the first, second and third hard-braking event levels have been reached and determining the ending of the individual hard-braking events when all of the first, second and third levels are determined to no longer be taking place;

selectively indicating to the vehicle operator the hard-braking event level that was determined to exist during individual hard-braking events, the third level being higher than the second level and the second level being higher than the first level, the hard-braking event level for each individual hard-braking event being indicated following the end of the individual hard-braking event;

blocking the indicating of the hard-braking event level for an individual hard-braking event if the lateral acceleration value exceeds a predetermined threshold; and wherein the indicating act comprises the act of selectively indicating the number of hard-braking events and number of rollover advisory events that have been indicated during a vehicle trip and during a segment of the trip.

40. An apparatus for advising a vehicle operator of vehicle driving conditions which create an increased risk of rollover of the vehicle, the apparatus comprising:

a vehicle mass determinator operable to determine the mass of a vehicle and to provide a mass indicating signal which corresponds to an estimate of the mass of the vehicle;

an acceleration estimator coupled to the vehicle mass determinator and responsive to the mass indicating signal to produce a critical acceleration estimate which is related to a critical lateral acceleration of the vehicle at which the risk of vehicle rollover is increased;

a vehicle lateral acceleration determinator operable to provide a lateral acceleration signal corresponding to the lateral acceleration of the vehicle;

a roll stability advisor coupled to the acceleration estimator and to the vehicle lateral acceleration determinator so as to receive the lateral acceleration signal and the critical acceleration estimate signal, the roll stability advisor being operable to compare the lateral acceleration signal and critical acceleration estimate signal to produce a rollover risk output signal corresponding to the result of the comparison with the rollover risk being greater as the lateral acceleration approaches the critical lateral acceleration; and an indicator operable to selectively indicate the rollover risk in response to the rollover risk output signal.

41. An apparatus according to claim 40 in which the roll stability advisor is operable to produce a rollover risk output signal indicative of the rollover risk exceeding a threshold, the indicator being operable to indicate rollover risks which exceed the threshold to a vehicle operator following the end of driving conditions which led to the rollover risk exceeding the threshold, whereby the vehicle operator is provided with feedback concerning driving conditions which result in increased rollover risks.

42. An apparatus according to claim 40 wherein the roll stability advisor is operable to compare the vehicle lateral acceleration signal and the critical acceleration estimate signal and to produce a rollover risk output signal indicative of a high rollover risk in the event the lateral acceleration is near enough to the critical acceleration estimate for a predetermined time period, the roll stability advisor being operable to produce a rollover risk output signal indicative of at least one of a plurality of levels of rollover risk depending upon the closeness of the lateral acceleration of the vehicle to the critical acceleration estimate.

43. An apparatus according to claim 40 wherein the acceleration estimator comprises a lookup table from which a critical acceleration estimate is found in response to the determined vehicle mass.

44. An apparatus for advising a vehicle operator of vehicle driving conditions which create an increased risk of rollover of the vehicle, the apparatus comprising:

a vehicle mass determinator operable to determine the mass of a vehicle and to provide a mass indicating signal which corresponds to an estimate of the mass of the vehicle;

an acceleration estimator coupled to the vehicle mass determinator and responsive to the mass indicating signal to produce a critical acceleration estimate which is related to a critical lateral acceleration of the vehicle at which the risk of vehicle rollover is increased;

a vehicle lateral acceleration determinator operable to provide a lateral acceleration signal corresponding to the lateral acceleration of the vehicle;

a roll stability advisor coupled to the acceleration estimator and to the vehicle lateral acceleration determinator so as to receive the lateral acceleration signal and the critical acceleration estimate signal, the roll stability advisor being operable to compare the lateral acceleration signal and critical acceleration estimate signal to produce a rollover risk output signal corresponding to the result of the comparison with the rollover risk being greater as the lateral acceleration approaches the critical lateral acceleration; and an indicator operable to selectively indicate the rollover risk in response to the rollover risk output signal;

wherein the roll stability advisor is operable to compare the vehicle lateral acceleration signal and the critical acceleration estimate signal and to produce a rollover risk output signal indicative of a high rollover risk in the event the lateral acceleration is near enough to the critical acceleration estimate for a predetermined time period, the roll stability advisor being operable to produce a rollover risk output signal indicative of at least one of a plurality of levels of rollover risk depending upon the closeness of the lateral acceleration of the vehicle to the critical acceleration estimate; and in which the roll stability advisor is operable to determine a ratio of the lateral acceleration signal to the critical acceleration estimate signal and to compare this ratio with plural risk threshold levels, the roll stability advisor being operable to require the ratio to be above at least one of the plural risk threshold levels for a time period if conditions are such that a rollover risk is to be indicated.

45. An apparatus according to claim 44 in which the roll stability advisor is operable to produce a vehicle speed reduction recommendation of a magnitude which varies with the determined risk threshold level of rollover risk that is indicated by the roll stability advisor, the speed reduction recommendation being produced after the end of driving conditions which led to indicate the existence of a rollover risk of a magnitude which is at least at one of the risk threshold levels.

46. An apparatus according to claim 45 wherein the indicator is operable alternately indicate the rollover risk level and the speed reduction recommendations.

47. An apparatus for advising a vehicle operator of vehicle driving conditions which create an increased risk of rollover of the vehicle, the apparatus comprising:

a vehicle mass determinator operable to determine the mass of a vehicle and to provide a mass indicating signal which corresponds to an estimate of the mass of the vehicle;

an acceleration estimator coupled to the vehicle mass determinator and responsive to the mass indicating signal to produce a critical acceleration estimate which is related to a critical lateral acceleration of the vehicle at which the risk of vehicle rollover is increased;

a vehicle lateral acceleration determinator operable to provide a lateral acceleration signal corresponding to the lateral acceleration of the vehicle;

a roll stability advisor coupled to the acceleration estimator and to the vehicle lateral acceleration determinator so as to receive the lateral acceleration signal and the critical acceleration estimate signal, the roll stability advisor being operable to compare the lateral acceleration signal and critical acceleration estimate signal to produce a rollover risk output signal corresponding to the result of the comparison with the rollover risk being greater as the lateral acceleration approaches the critical lateral acceleration; and an indicator operable to selectively indicate the rollover risk in response to the rollover risk output signal;

in which the vehicle includes an automatically modulated braking system which produces second signals indicating the deceleration of the vehicle and first signals whenever any vehicle wheels beings controlled by the automatically modulated braking system are being modulated;

a hard-braking event detector operable in response to the first signals to produce a first hard-braking event signal in the event the automatically modulated braking system is modulating at least one wheel of the vehicle, the first hard-braking event signal indicating a first hard-braking event level;

the hard-braking event detector also being operable to produce a second hard-braking event signal in response to the second signals in the event the automatically modulated braking system indicates deceleration of the vehicle at least at a first rate and at least for a first time period without at least one wheel being modulated by the automatically modulated braking system, the second hard-braking event signal indicating a second hard-braking event level;

the hard-braking event detector also being operable to produce a third hard-braking event signal corresponding to a third hard-braking event level in response to the first and second signals and in the event both the first and second hard-braking event levels are reached during a braking event, the braking event commencing upon the detection of any of the first and second hard-braking event signals and ending upon the end of both of the first and second hard-braking event signals; and wherein the indicator is operable to selectively indicate the hard-braking event level that has been detected.

48. An apparatus according to claim 47 in which the hard-braking event detector is coupled to the lateral acceleration determinator to receive the lateral acceleration signal, and wherein the hard-braking event detector is operable to block the indication of a hard-braking event level in the event the vehicle lateral acceleration as indicated by the lateral acceleration signal exceeds an acceleration threshold.

49. An apparatus according to claim 48 in which a hard-braking event level is indicated following the end of the hard-braking event which resulted in the determination of the hard-braking event level.

50. A vehicle display responsive to input signals to produce alphanumeric messages corresponding to the vehicle being operated under conditions which increase the risk of vehicle rollover, the messages including at least one rollover risk message indicating the level of rollover risk and at least one speed reduction message recommending a level at which vehicle speed should be reduced; and a data input device, the apparatus being responsive to an acknowledgement signal entered by the data input device to terminate the messages.

51. A vehicle display responsive to input signals to produce alphanumeric messages corresponding to the vehicle being operated under conditions which increase the risk of vehicle rollover, the messages including at least one rollover risk message indicating the level of rollover risk and at least one speed reduction message recommending a level at which vehicle speed should be reduced; and in which there are at least two such rollover risk messages, one indicating a rollover risk at a first level and a second indicating a rollover risk at a second level and wherein there are at least two such speed reduction messages, the speed reduction messages recommending different magnitudes of speed reduction with a higher recommended magnitude of speed reduction corresponding to the higher rollover risk message and the lower recommended magnitude of speed reduction corresponding to the lower of roller risk.

52. A display according to claim 51 in which the rollover risk and speed reduction messages are alternately displayed.

53. An apparatus according to claim 52 in which the rollover risk messages of a higher level are visually and auditorially distinguished from rollover risk messages of a lower level.

54. An apparatus according to claim 52 including a data input device, the apparatus being responsive to an acknowledgement signal entered by the data input device to terminate the messages.

55. An apparatus according to claim 54 in which the data input device has a key with a first symbol, the messages also containing the first symbol, whereby the acknowledgement is entered by the key having the first symbol thereon.

56. An apparatus for advising a vehicle operator of vehicle driving conditions which create an increased risk of rollover of the vehicle, the apparatus comprising:

means for generating a first signal corresponding to a critical acceleration estimate, the critical acceleration estimate being determined from an estimated mass of the vehicle and being based on a set of rules;

means for producing a second signal corresponding to the vehicle lateral acceleration;

roll stability advisor means for comparing the first and second signals and for producing an output signal indicative of the rollover risk; and indicator means for indicating the rollover risk in response to the roll stability advisor output signal.

57. An apparatus according to claim 56 in which the roll stability advisor also comprises means for selectively providing an output signal indicating recommended speed reductions and wherein the indicator means selectively indicates the rollover risk and speed reduction recommendations to a vehicle operator.

58. An apparatus for advising a vehicle operator of vehicle driving conditions which create an increased risk of rollover of the vehicle, the apparatus comprising:

means for generating a first signal corresponding to a critical acceleration estimate, the critical acceleration estimate being determined from an estimated mass of the vehicle and being based on a set of rules;

means for producing a second signal corresponding to the vehicle lateral acceleration;

roll stability advisor means for comparing the first and second signals and for producing an output signal indicative of the rollover risk; and indicator means for indicating the rollover risk in response to the roll stability advisor output signal;

in which the roll stability advisor also comprises means for selectively providing an output signal indicating recommended speed reductions and wherein the indicator means selectively indicates the rollover risk and speed reduction recommendations to a vehicle operator; and also comprising hard-braking event detector means for determining whether hard-braking events have occurred and for producing an output signal indicative of the level of hard-braking event which has occurred, and wherein the indicator means selectively indicates the existence of a hard-braking event and the level of the hard-braking event.

59. In a vehicle which includes an automatically modulated braking system which produces second signals indicating the deceleration of the vehicle and first signals whenever any vehicle wheels beings controlled by the automatically modulated braking system are being modulated, an apparatus for detecting and indicating hard-braking events comprising:

a hard-braking event detector operable in response to the first signals to produce a first hard-braking event signal in the event the automatically modulated braking system is modulating at least one wheel of the vehicle, the first hard-braking event signal indicating a first hard-braking event level;

the hard-braking event detector also being operable to produce a second hard-braking event signal corresponding to a second hard-braking event level in response to the second signals in the event the automatically modulated braking system indicates deceleration of the vehicle at least at a first rate and at least for a first time period without at least one wheel being modulated by the automatically modulated braking system;

the hard-braking event detector also being operable to produce a third hard-braking event signal corresponding to a third hard-braking event level in response to the first and second signals in the event both the first and second hard-braking event levels are reached during a braking event, the braking event commencing upon the detection of any of the first and second hard-braking event signals and ending upon the end of both of the first and second hard-braking event signals; and an indicator coupled to the hard-braking event detector and operable to selectively indicate the hard-braking event level that has been detected.

60. An apparatus according to claim 59 in which the hard-braking event detector has an input for receiving lateral acceleration signals indicative of the lateral acceleration of the vehicle, and wherein the hard-braking event detector is operable to block the indication of a hard-braking event level in the event the vehicle lateral acceleration as indicated by the lateral acceleration signal exceeds an acceleration threshold.

61. An apparatus according to claim 60 in which the hard-braking event detector blocks the indication of a hard-braking event level after the end of a hard-braking event which resulted in the determination of the hard-braking event level.

62. A method of advising a vehicle operator of vehicle of driving conditions which create an increased risk of loss of control of the vehicle, the method comprising:

determining the existence of at least one rollover advisory event during which the risk of vehicle rollover is unacceptably high;

advising the vehicle operator of the existence of an unacceptably high rollover risk following the end of the rollover advisory event.

63. A method according to claim 62 comprising the act of selectively advising the vehicle operator of a speed reduction recommendation following the end of the rollover advisory event.

64. A method of advising a vehicle operator of vehicle of driving conditions which create an increased risk of loss of control of the vehicle, the method comprising:

determining the existence of at least one rollover advisory event during which the risk of vehicle rollover is unacceptably high;

advising the vehicle operator of the existence of an unacceptably high rollover risk following the end of the rollover advisory event;

comprising the act of determining the existence of at least one hard-braking event during which the risk of loss of control of the vehicle due to braking is unacceptably high; and selectively advising the vehicle operator of the existence of the hard-braking event following the end of the hard-braking event.

* * * * *

UNITED STATES PATENT AND TRADEMARK OFFICE
CERTIFICATE OF CORRECTION

PATENT NO. : 6,498,976 B1
DATED : December 24, 2002
INVENTOR(S) : Ehlbeck et al.

It is certified that error appears in the above-identified patent and that said Letters Patent is hereby corrected as shown below:

Column 1,
Line 45, change "viewed." to -- viewed --

Column 10,
Line 17, change "addition." to -- addition, --

Column 13,
Line 35, change "limitation." to -- limitation, --

Column 14,
Line 7, change "example." to -- example, --

Column 17,
Line 37, change "classy" to -- class --

Column 19,
Line 63, change "or" to -- for --

Column 24,
Line 5, change "304." to -- 304, --

Column 30,
Line 5, change "tailer" to -- trailer --

Signed and Sealed this

Twenty-eighth Day of October, 2003

JAMES E. ROGAN
*Director of the United States Patent and Trademark Office*